United States Patent
Da Silva et al.

(10) Patent No.: US 11,895,545 B2
(45) Date of Patent: Feb. 6, 2024

(54) SUSPEND-RESUME IN CONDITIONAL HANDOVER

(71) Applicant: TELEFONAKTIEBOLAGET LM ERICSSON (PUBL), Stockholm (SE)

(72) Inventors: Icaro L. J. Da Silva, Solna (SE); Patrik Rugeland, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 295 days.

(21) Appl. No.: 17/293,328

(22) PCT Filed: Dec. 19, 2019

(86) PCT No.: PCT/IB2019/061124
§ 371 (c)(1),
(2) Date: May 12, 2021

(87) PCT Pub. No.: WO2020/128966
PCT Pub. Date: Jun. 25, 2020

(65) Prior Publication Data
US 2022/0014985 A1    Jan. 13, 2022

Related U.S. Application Data

(60) Provisional application No. 62/781,760, filed on Dec. 19, 2018.

(51) Int. Cl.
*H04W 36/00* (2009.01)
*H04W 76/19* (2018.01)
(Continued)

(52) U.S. Cl.
CPC ..... *H04W 36/00837* (2018.08); *H04W 24/08* (2013.01); *H04W 36/0058* (2018.08); *H04W 76/19* (2018.02); *H04W 76/36* (2018.02)

(58) Field of Classification Search
None
See application file for complete search history.

(56) References Cited

U.S. PATENT DOCUMENTS

2018/0227819 A1    8/2018    Lee et al.
2018/0270895 A1    9/2018    Park et al.
(Continued)

FOREIGN PATENT DOCUMENTS

EP    2645806 A1    10/2013
EP    3513604        7/2019
(Continued)

OTHER PUBLICATIONS

Ericsson, "Ciphering and integrity protection configuration per DRB", 3GPP TSG-RAN WG2 #97, Athens, Greece, Jan. 13-17, 2017, pp. 1-5, Tdoc R2-1700864, 3GPP.
(Continued)

*Primary Examiner* — Suhail Khan

(57) ABSTRACT

Systems, methods and apparatus are disclosed for handling conditional handover configurations by wireless devices and network nodes.

An example method performed by a wireless device includes receiving and storing one or more conditional handover configurations associated with a target cell candidate. The wireless device transitions from a connected state to a sleeping state, where the transition includes discarding the conditional handover configurations. The wireless device releases resources associated with the conditional handover configurations and performs clean up actions relating to conditional handover.

An example method performed by a network node includes providing, to a user equipment, one or more conditional handover configurations that are associated with a target cell candidate. The network node transmits, to the user equipment, a message to transition from a connected state to a
(Continued)

sleeping state. After transmitting the message, the network node discards the conditional handover configurations.

15 Claims, 11 Drawing Sheets

(51) Int. Cl.
*H04W 76/36* (2018.01)
*H04W 24/08* (2009.01)

(56) References Cited

U.S. PATENT DOCUMENTS

2019/0380081 A1* 12/2019 Chang .................. H04W 36/18
2020/0022042 A1* 1/2020 Yin ................ H04W 36/00837
2021/0321298 A1* 10/2021 Keskitalo ............. H04W 36/36

FOREIGN PATENT DOCUMENTS

| WO | 2017138978 | A1 | 8/2017 |
| WO | 2018113661 | A1 | 6/2018 |
| WO | 20181757211 | A1 | 9/2018 |

OTHER PUBLICATIONS

Ericsson, "Suspend/Release while monitoring CHO in NR", 3GPP TSG-RAN WG2 #108, Reno, Nevada, USA, Nov. 18-22, 2019, pp. 1-7, R2-1914636, 3GPP.

* cited by examiner

Prior Art

Prior Art

Prior Art

Prior Art

SUSPEND-RESUME IN CONDITIONAL HANDOVER

RELATED APPLICATION

The present application is a 371 of International Application No. PCT/IB2019/061124, filed Dec. 19, 2019, which claims the benefit of and priority to U.S. Provisional Patent Application No. 62/781,760, filed Dec. 19, 2018, entitled "SUSPEND-RESUME IN CONDITIONAL HANDOVER," the disclosure of which is hereby incorporated herein by reference in its entirety.

TECHNICAL FIELD

The present disclosure relates generally to wireless communications systems and, more particularly, to wireless communications and related operations corresponding to conditional handover.

BACKGROUND

RRC Connection Resume in NR and eLTE

FIG. 1A shows an example state transition corresponding to a user equipment (UE) in New Radio (NR). In this example, the Radio Resource Control (RRC) state model is updated in New Radio (NR) (and in enhanced Long-Term Evolution (eLTE), for example, for LTE connected to a 5G Core Network (5GC) scenarios) and a new RRC_INACTIVE state is introduced in addition to the existing RRC_IDLE and RRC_CONNECTED states inherited from LTE. In RRC_INACTIVE, the UE context from the previous RRC connection is stored in the RAN and is re-used the next time an RRC connection is established. The UE context includes information such as the UE security configuration, configured radio bearers etc. By storing the UE context in the Radio Access Network (RAN), one avoids the signaling required for security activation and bearer establishment which is normally required when transitioning from RRC_IDLE to RRC_CONNECTED. This improves latency and reduces the signaling overhead.

FIG. 1B shows example RRC messaging between a UE and an NR base station (gNB) to suspend a connection. In this example, RRC_INACTIVE mode is realized by introducing two new procedures "RRC connection suspend" (also called RRC connection release with SuspendConfig) and "RRC connection resume." The gNB suspends a connection and moves the UE from RRC_CONNECTED to RRC_INACTIVE by sending an RRC release message with suspend indication (or configuration) to the UE. This may happen for example after the UE has been inactive for a certain period which causes the gNB internal inactivity timer to expire. Both the UE and gNB store the UE context and the associated identifier (referred to as I-RNTI). It has been recently updated that two identifiers will be configured in the suspend configuration, a long and short I-RNTI. The one to be used in resume depends on an indication from the network in system information of the cell in which the UE tries to resume. The two I-RNTI identifiers were introduced to support scenarios when the UE is resuming in a cell that only gives the UE a small scheduling grant for the first UL message. Examples of an RRC resume request include RRCResume Request and RRCResumeRequest1.

FIG. 1C shows example RRC messaging between a UE and a gNB to resume a connection. In this example, to transition to an RRC_CONNECTED state, the UE resumes the connection by sending an RRC resume request including the following information to the gNB with which the UE attempts to resume the connection (this may be a same or different cell/gNB from which the connection was suspended):

The I-RNTI (either the long or short I-RNTI depending on the system information indication), A security token (called resumeMAC-I in the specification) that is used to identify and verify the UE at RRC connection resume; and An indication of the cause of the resume (for example, mobile originated data).

The gNB that serves the cell in which the UE is resuming is sometimes referred to as the target gNB, while the gNB serving the cell in which the UE was suspended in is sometimes referred to as the source gNB. To resume the connection, the target gNB determines which gNB is the source gNB (considering the gNB part of the I-RNTI) and request that gNB to send the UE s context. The target provides in the request, among other things, the UE ID and security token received from the UE as well as the target cell Cell ID.

The source gNB then locates the UE context based on the I-RNTI and verifies the request based on the security token (see next section). If successful, the gNB forwards the UE context to the target gNB, which then responds to the UE with RRC resume to confirm the connection is being resumed. The RRC resume message may also contain configurations to reconfigure the radio bearers being resumed. Finally, the UE acknowledges the reception of the RRC re-establishment by sending RRC re-establishment complete.

The described NR RRC resume procedure works in a similar way in LTE (even though in the state model the UE is considered in RRC_IDLE with a stored context) and eLTE (i.e. when LTE is connected to 5GC).

FIG. 1D shows example messaging corresponding to a successful RRC connection resume. In NR and in eLTE (LTE connected to 5GC) the RRCResume message in response to an RRCResumeRequest is encrypted and integrity protected. That is done using new security keys, derived based on the stored AS security context. This new key derivation (sort of a key update) is done as part of the resume procedure as part of the transmission of the RRCResumeRequest (or RRCResumeRequest1).

Other messages may be sent in response to the RRCResumeRequest message. In NR and eLTE, after the UE sends an RRC resume request message (for example, an RRCResumeRequest or RRCResumeRequest1 message), the UE may receive one or more of the below messages on SRB1 that may be encrypted and integrity protected, as described above:

RRCRelease with suspend configuration moving the UE to RRC_INACTIVE,

RRCRelease without suspend configuration moving the UE to RRC_IDLE; and/or

RRCResume moving the UE to RRC_CONNECTED.

Other messages may also be transmitted, an RRCReject with wait timer or RRCSetup (to fallback to RRC_IDLE) but on SRB0 (which would not be encrypted or integrity protected).

FIG. 1E shows example messaging corresponding to a successful RRC connection resume fallback to RRC connection establishment.

FIG. 1F shows example messaging corresponding to a successful RRC connection resume followed by network release.

FIG. 1G shows example messaging corresponding to a successful RRC connection resume followed by network suspend.

FIG. 1H shows example messaging corresponding to a network rejection of an RRC connection resume request.

Mobility Robustness Work Item in Rel-16 for LTE and NR and Conditional Handover (CHO)

Two new work items for mobility enhancements in LTE and NR have started in 3GPP in release 16. The main objectives of the work items are to improve robustness and decrease the interruption time at handover.

One problem related to robustness at handover is that the Handover (HO) Command (RRCConnedionReconfiguration with mobilityControlInfo and RRCReconfiguration with a reconfiguration WithSync field) is normally sent when the radio conditions for the UE are already quite bad. That may lead to the HO Command not reaching the UE in time, if the message is segmented or there are retransmissions.

In LTE and NR, different solutions to increase mobility robustness have been discussed in the past. One solution discussed in NR is called "conditional handover" or "early handover command." To avoid the undesired dependence on the serving radio link upon the time (and radio conditions) where the UE should execute the handover, the possibility to provide RRC signaling for the handover to the UE earlier should be provided. To achieve this, it should be possible to associate the HO command with a condition, for example, based on radio conditions possibly similar to the ones associated to an A3 event, where a given neighbour becomes X dB better than target. As soon as the condition is fulfilled, the UE executes the handover in accordance with the provided handover command.

Such a condition could be, for example, that the quality of the target cell or beam becomes X dB stronger than the serving cell (similar to an A3-like event may be configured to trigger measurement reports). The threshold Y used in a preceding measurement reporting event should then be chosen lower than the one in the handover execution condition. This allows the serving cell to prepare the handover upon reception of an early measurement report and to provide the RRCConnectionReconfiguration with mobilityControlInfo (LTE) or RRCReconfiguration with a reconfiguration With Sync (NR) at a time when the radio link between the source cell and the UE is still stable. The execution of the handover is done at a later point in time (and threshold) which is considered optimal for the handover execution.

FIG. 1I shows an example conditional handover with a single serving and target cell. In practice there may often be many cells or beams that the UE reported as possible candidates based on its preceding RRM measurements. In RAN2 #104 in Spokane in November 2018, it was agreed that LTE support configuration of one or more candidate cells for conditional handover, with the amount of candidate cells being left for future study.

Based on the latest agreements, the network may configure conditional handover commands for several of those candidates. The RRCConnectionReconfiguration (or RRCReconfiguration, in NR) for each of those candidates may differ, for example, in terms of the HO execution condition (RS to measure and threshold to exceed), in terms of the RA preamble to be sent when a condition is met or the configuration itself to be used in a specific target node candidate.

While the UE evaluates the condition, it should continue operating per its current RRC configuration, i.e., without applying the conditional HO command. When the UE determines that the condition is fulfilled, it disconnects from the serving cell, applies the conditional HO command and connects to the target cell. These steps are equivalent to the current, instantaneous handover execution.

Inter-node Messages for Mobility Preparation

RRC Inter-Node Messages

In NR and LTE, two inter-node messages are typically used: HandoverPreparationInformation and HandoverCommand. When the source node decides to handover the UE, the source node provides the target node with some information in the HandoverPreparationInformation that enables the target node to prepare an RRCReconfiguration (provided in the HandoverCommand) be used in target upon handover execution. Definitions from TS 38.331 are shown below (but a similar procedure exists in TS 36.331):

HandoverPreparationInformation Message

This message is used to transfer the NR RRC information used by the target gNB during handover preparation, including UE capability information, with the direction being source gNB/source RAN to target gNB.

```
-- ASN1START
-- TAG-HANDOVER-PREPARATION-INFORMATION-START
HandoverPreparationInfomiation ::= SEQUENCE {
    criticalExtensions              CHOICE {
        c1                          CHOICE{
            handoverPreparationInformation                  HandoverPreparationInformation-IEs,
            spare3 NULL, spare2 NULL, spare1 NULL
        },
        criticalExtensionsFuture                            SEQUENCE { }
    }
}
HandoverPreparationInformation-IEs ::= SEQUENCE {
    ue-CapabilityRAT-List                       UE-CapabilityRAT-ContainerList,
    sourceConfig            AS-Config           OPTIONAL, -- Cond HO
    rrm-Config              RRM-Config          OPTIONAL,
    as-Context              AS-Context          OPTIONAL,
    nonCriticalExtension            SEQUENCE { }        OPTIONAL
}
AS-Config ::=           SEQUENCE {
    rrcReconfiguration              OCTET STRING (CONTAINING RRCReconfiguration),
    ...
}
```

```
AS-Context ::=                      SEQUENCE {
    reestablishmentInfo             ReestablishmentInfo             OPTIONAL,
    configRestrictInfo              ConfigRestrictInfoSCG           OPTIONAL,
    ...,
    [[ ran-NotificationAreaInfo                         RAN-NotificationAreaInfo OPTIONAL
    ]]
}
ReestablishmentInfo ::=             SEQUENCE {
    sourcePhysCellId                    PhysCellId,
    targetCellShortMAC-I                ShortMAC-I,
    additionalReestabInfoList           ReestabNCellInfoList        OPTIONAL
}
ReestabNCellInfoList ::=            SEQUENCE ( SIZE (1..maxCellPrep) ) OF
ReestabNCellInfo
ReestabNCellInfo::=                 SEQUENCE{
    cellIdentity                    CellIdentity,
    key-gNodeB-Star                             BIT STRING (SIZE (256)),
    shortMAC-I                          ShortMAC-I
}
RRM-Config ::=                      SEQUENCE {
    ue-InactiveTime                 ENUMERATED {
    s1, s2, s3, s5, s7, s10, s15, s20,
    s25, s30, s40, s50, min1, min1s20c, min1s40,
    min2, min2s30, min3, min3s30, min4, min5, min6,
    min7, min8, min9, min10, min12, min14, min17, min20,
    min24, mm28, mm33, mm38, min44, min50, hr1,
    hr1min30, hr2, hr2mm30, br3, hr3min30, hr4, hr5, hr6,
    hr8, hr10, hr13, hr16, hr20, day1, day1hr12, day2,
    day2hr12, day3, day4, day5, day7, day10, day14, day19,
    day24, day30, dayMoreThan30}                        OPTIONAL,
    candidateCellInfoList           MeasResultList2NR               OPTIONAL,
    ...
}
-- TAG-HANDOVER-PREARATION-INFORMATION-STOP
-- ASN1STOP
```

HandoverPreparationInformation field descriptions as-Context
Local RAN context required by the target gNB.
sourceConfig
The radio resource configuration as used in the source cell.
rrm-Config
Local RAN context used mainly for RRM purposes.
ue-CapabilityRAT-List
The UE radio access related capabilities concerning RATs supported by the UE. FFS whether certain capabilities are mandatory to provide by source, for example, of target and/or source RAT.

| Conditional Presence | Explanation |
|---|---|
| HO | The field is mandatory present in case of handover within NR; The field is optionally present in case of handover from E-UTRA connected to 5GC; otherwise the field is not present. |

NOTE 2: The following table indicates per source RAT whether RAT capabilities are included or not.

| Source RAT | NR capabilites | E-UTRA capabilities | MR-DC capabilities |
|---|---|---|---|
| NR | Included | May be included | May be included |
| E-UTRAN | Included | May be included | May be included |

RRM-Config field descriptions candidateCellInfoList
A list of the best cells on each frequency for which measurement information was available HandoverCommand Message This message is used to transfer the handover command as generated by the target gNB, with the direction being target gNB to source gNB/source RAN.

```
-- ASN1START
-- TAG-HANDOVER-COMMAND-START
HandoverCommand ::=                 SEQUENCE {
    criticalExtensions          CHOICE {
        c1          CHOICE{
            handoverCommand                 HandoverCommand-IEs,
            Spare3 NULL, spare2 NULL, spare1 NULL
        },
        criticalExtensionsFuture        SEQUENCE { }
    }
}
HandoverCommand-IEs ::=             SEQUENCE {
    handoverCommandMessage                      OCTET STRING
    (CONTAINING RRCReconfiguration),
    nonCriticalExtension        SEQUENCE { }    OPTIONAL
}
-- TAG-HANDOVER-COMMAND-STOP
-- ASN1STOP
```

Xn Inter-Node Messages for Handover/DC-Setup

According to TS 38.420, there is a function called "Handover preparation function" that allows the exchange of information between source and target NG-RAN nodes in order to initiate the handover of a certain UE to the target. An equivalent (unction exists for DC setup, called "S-NG-RAN-node Addition Preparation".

Another function that is relevant for the context of this disclosure is the "Handover canceling function" function that allows informing an already prepared target NG-RAN node that a prepared handover will not take place. It allows releasing the resources allocated during a preparation.

Relevant portions of TS 38.423 are reproduced below. These portions are accompanied by the drawings that have been reproduced in FIGS. 1J, 1K, and 1L.

8.2.1 Handover Preparation
8.2.1.2 Successful Operation
The source NG-RAN node initiates the procedure by sending the HANDOVER REQUEST message to the target NG-RAN node. When the source NG-RAN node sends the HANDOVER REQUEST message, it shall start the timer TXnRELOCprep.
At reception of the HANDOVER REQUEST message the target NG-RAN node shall prepare the configuration of the AS security relation between the UE and the target NG-RAN node by using the information in the UE Security Capabilities IE and the AS Security Information IE in the UE Context Information IE, as specified in IS 33.501 [28].
8.2.1.3 Unsuccessful Operation
If the target NG-RAN node does not admit at least one PDU session resource, or a failure occurs during the Handover Preparation, the target NG-RAN node shall send the HANDOVER PREPARATION FAILURE message to the source NG-RAN node. The message shall contain the Cause IE with an appropriate value.
Interactions with Handover Cancel procedure:
If there is no response from the target NG-RAN node to the HANDOVER REQUEST message before timer TXnRELOCprep expires in the source NG-RAN node, the source NG-RAN node should cancel the Handover Preparation procedure towards the target NG-RAN node by initiating the Handover Cancel procedure with the appropriate value for the Cause IE. The source NG-RAN node shall ignore any HANDOVER REQUEST ACKNOWLEDGE or HANDOVER PREPARATION FAILURE message received after the initiation of the Handover Cancel procedure and remove any reference and release any resources related to the concerned Xn UE-associated signalling.
8.2.1.4 Abnormal Conditions
If the supported algorithms for encryption defined in the UE Security Capabilities IE in the UE Context Information IE, plus the mandated support of the EEA0 and NEA0 algorithms in all UEs (TS 33.501 [28]), do not match any allowed algorithms defined in the configured list of allowed encryption algorithms in the NG-RAN node (TS 33.501 [28]), the NG-RAN node shall reject the procedure using the HANDOVER PREPARATION FAILURE message.
If the supported algorithms for integrity defined in the UE Security Capabilities IE in the UE Context Information IE, plus the mandated support of the EIA0 and NIA0 algorithms in all UEs (TS 33.501 [28]), do not match any allowed algorithms defined in the configured list of allowed integrity protection algorithms in the NG-RAN node (TS 33.501 [28]), the NG-RAN node shall reject the procedure using the HANDOVER PREPARATION FAILURE message.

8.2.3 Handover Cancel
8.2.3.1 General
The Handover Cancel procedure is used to enable a source NG-RAN node to cancel an ongoing handover preparation or an already prepared handover.
The procedure uses UE-associated signalling.
8.2.3.2 Success fill Operation
The source NG-RAN node initiates the procedure by sending the HANDOVER CANCEL message to the target NG-RAN node. The source NG-RAN node shall indicate the reason for cancelling the handover by means of an appropriate cause value.
8.2.3.3 Unsuccessful Operation
Not applicable.
8.2.3.4 Abnormal Conditions
If the HANDOVER CANCEL message refers to a context that does not exist, the target NG-RAN node shall ignore the message.
FIG. 1J shows a successful operation corresponding to handover preparation, as specified in 8.2.1.2.
FIG. 1K shows an unsuccessful operation corresponding to handover preparation, as specified in 8.2.1.3.
FIG. 1L shows a successful operation corresponding to handover cancel, as specified in 8.2.1.2.
Inter-Node Messages for Mobility Execution
Descriptions the inter-node preparation procedure for handover are provided above. The inter-node procedures at mobility execution are described below, in particular the inter-node steps that follow after a handover execution (for example, upon the reception of a handover complete message at the target node, such as RRCReconfigurationComplete). As described in the RRC connection resume in NR and eLTE section (above), upon the reception of an RRCReconfigurationComplete the target node (a gNodeB in NR, or in more general terms a NG-RAN node as described in 38.413) triggers a Path Switch Request procedure by transiting a PATH SWITCH REQUEST towards an Access Management Function (AMF), as shown below. This portion is accompanied by the drawing that has been reproduced in FIG. 1M.

8.4.4 Path Switch Request
8.4.4.1 General
The purpose of the Path Switch Request procedure is to request the switch of a downlink GTP tunnel towards a new GTP tunnel endpoint.
8.4.4.2 Successful Operation
The NG-RAN node initiates the procedure by sending the PATH SWITCH REQUEST message to the AMF.
After all necessary updates including the UP path switch have been successfully completed in the 5GC for at least one of the PDU session resources included in the PATH SWITCH REQUEST, the AMF shall send the PATH SWITCH REQUEST ACKNOWLEDGE message to the NG-RAN node and the procedure ends.
The list of accepted QoS flows shall be included in the PATH SWITCH REQUEST message within the Path Switch Request Transfer IE. The SME shall handle this information as specified in TS 23.502 [10].
The list of PDU sessions which jailed to be setup, if any, shall be included in the PATH SWITCH REQUEST message within the Path Switch Request Setup Failed Transfer IE. The AMF shall handle this information as specified in TS 23.502 [10]
For each PDU session for which the User Plane Security Information IE is included in the Path Switch Request Transfer IE of the PATH SWITCH REQUEST message, the SMF shall behave as specified in TS 33.501 [13] and may send back the Security Indication IE within the Path Switch Request Acknowledge Transfer IE of the PATH SWITCH REQUEST ACKNOWLEDGE message.

If the Security Indication IF, is included within the Path Switch Request Acknowledge Transfer IE of the PATH SWITCH REQUEST ACKNOWLEDGE message, the NG-RAN node shall behave as specified in TS 33.501 [13].

If the UL NG-U UP TNL Information IE is included within the Path Switch Request Acknowledge Transfer IF, of the PATH SWITCH REQUEST ACKNOWLEDGE message, the NG-RAN node shall store this information and use it as the uplink termination point for the user plane data for this PDU session.

If the Core Network Assistance Information IF, is included in the PATH SWITCH REQUEST ACKNOWLEDGE message, the NG-RAN node shall, if supported, store this information in the UE context and use it for e.g. the RRC_INACTIVE state decision and RNA configuration for the UE and RAN paging if any for a UE in RRC_INACTIVE state, as specified in TS 38.300 [8].

If the RRC Inactive Transition Report Request IE is included in the PATH SWITCH REQUEST ACKNOWLEDGE message, the NG-RAN node shall, if supported, store this information in the UE context and 1.—report to the AMF the RRC state of the UE when the UE enters or leaves RRC_INACTIVE state in case the RRC Inactive Transition Report Request IE is set to "subsequent state transition report"; or
2.—send one RRC INACTIVE TRANSITION REPORT message but no subsequent messages if the UE is in RRC_CONNECTED state and the RRC Inactive Transition Report Request IE is set to "single RRC connected state report", or
3.—send one RRC INACTIVE TRANSITION REPORT message plus one subsequent RRC INACTIVE TRANSITION REPORT message when the RRC state transitions to RRC_CONNECTED state if the UE is in RRC_INACTIVE state and the RRC Inactive Transition Report Request IE is set to "single RRC connected state report", or
4.—stop reporting to the AMF the RRC state of the UE in case the RRC Inactive Transition Report Request IE is set to "cancel report".

If the New Security Context Indicator IE is included in the PATH SWITCH REQUEST ACKNOWLEDGE message, the NG-RAN node shall use the information as specified in TS 33.501 [13].

Upon reception of the PATH SWITCH REQUEST ACKNOWLEDGE message the NG-RAN node shall store the received Security Context IE in the UE context and the NG-RAN node shall use it as specified in TS 33.501 [13].

If the UE Security Capabilities IE is included in the PATH SWITCH REQUEST ACKNOWLEDGE message, the NG-RAN node shall handle it accordingly (TS 33.501 [13]).

If the PDU Session Resource Released List IE is included in the PA TH SWITCH REQUEST ACKNOWLEDGE message, the NG-RAN node shall release the corresponding QoS flows and regard the PDU session(s) indicated in the PDU Session Resource Released List IE as being released. The appropriate cause value for each PDU session released is included in the Path Switch Request Unsuccessful Transfer IE contained in the PATH SWITCH REQUEST ACKNOWLEDGE message.

FIG. 1M shows a successful operation corresponding to a path switch request. Once the Path Switch Request procedure is completed, the target node triggers a UE context release procedure by transmitting a UE CONTEXT RELEASE message to the source NG-RAN node. That is shown below as described in TS 38.423. This portion is accompanied by the drawing that has been reproduced in FIG. 1N.

8.2.7 UE Context Release
8.2.7.1 General

For handover, the UE Context Release procedure is initiated by the target NG-RAN node to indicate to the source NG-RAN node that radio and control plane resources for the associated UE context are allowed to be released.

The procedure uses UE-associated signalling.

8.2.7.2 Successful Operation
Handover

The UE Context Release procedure is initiated by the target NG-RAN node. By sending the UE CONTEXT RELEASE message the target NG-RAN node informs the source NG-RAN node of Handover success and triggers the release of resources.

8.2.7.3 Unsuccessful Operation
Not applicable.
8.2.7.4 Abnormal Conditions

If the UE Context Release procedure is not initiated towards the source NG-RAN node from any prepared NG-RAN node before the expiry of the timer TXnRELOCoverall, the source NG-RAN node shall request the AMF to release the UE context.

If the UE returns to source NG-RAN node before the reception of the UE CONTEXT RELEASE message or the expiry of the timer TXnRELOCoverall, the source NG-RAN node shall stop the TXnRELOCoverall and continue to serve the UE.

FIG. 1N shows a successful operation for handover corresponding to a UE Context Release.

SUMMARY

The examples described in the present disclosure provides techniques for reducing ambiguity and/or mismatches between user equipment and network behavior, thereby lowering the risk of handover failure and improving connection stability. Moreover, the techniques described herein offer improved efficiency relating to the use of network resources. Other advantages may be readily apparent to one having skill in the art. Certain examples may have none, some, or all of the recited advantages.

A system of one or more computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method performed by a wireless device for handling conditional handover configurations, that includes the wireless device receiving and storing one or more conditional handover configurations, where each of the one or more handover configurations is associated with a target cell candidate. The method also includes the wireless device transitioning from a connected state to a sleeping state, where the transitioning includes discarding the one or more conditional handover configurations. The method also includes the wireless device releasing resources associated with the one or more conditional handover configurations and performing one or more clean up actions relating to conditional handover. Other embodiments of this aspect include corresponding computer systems, apparatus, and computer programs recorded on one or more computer storage devices, each configured to perform the actions of the methods.

One general aspect includes a method performed by a network node. The method includes providing, to a UE, one or more conditional handover configurations that are each associated with a target cell candidate. The method also includes the network node transmitting, to the UE, a message to suspend to from a connected state to a sleeping state. The method also includes the network node discarding the one or more conditional handover configurations after transmitting the message. Other embodiments of this aspect include corresponding computer systems, apparatus, and computer programs recorded on one or more computer storage devices, each configured to perform the actions of the methods.

BRIEF DESCRIPTION OF THE DRAWINGS

For a more complete understanding of the disclosed embodiments and their features and advantages, reference is now made to the following description, taken in conjunction with the accompanying drawings.

DETAILED DESCRIPTION

Figure 1A:
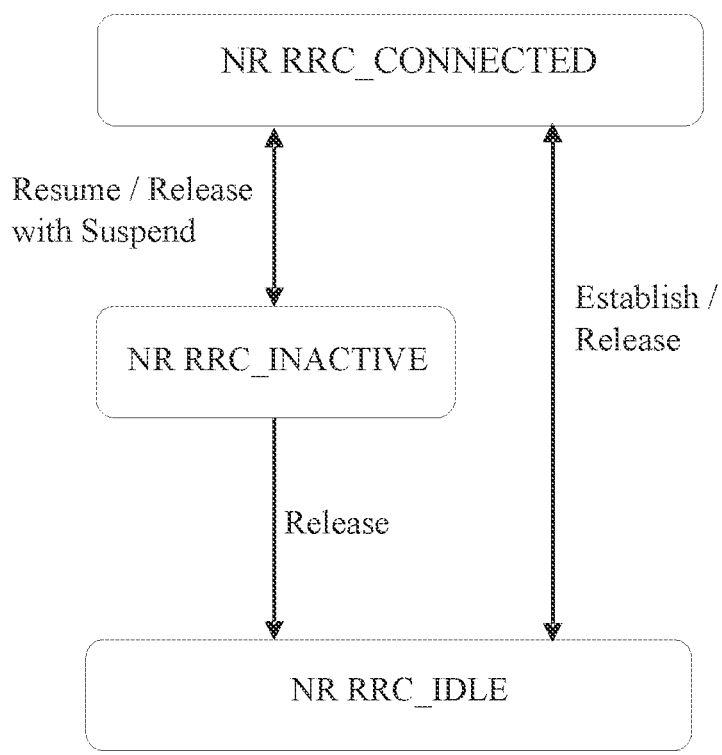
FIG. 1A shows an example state transition corresponding to a user equipment (UE) in New Radio (NR).
Figure 1B:
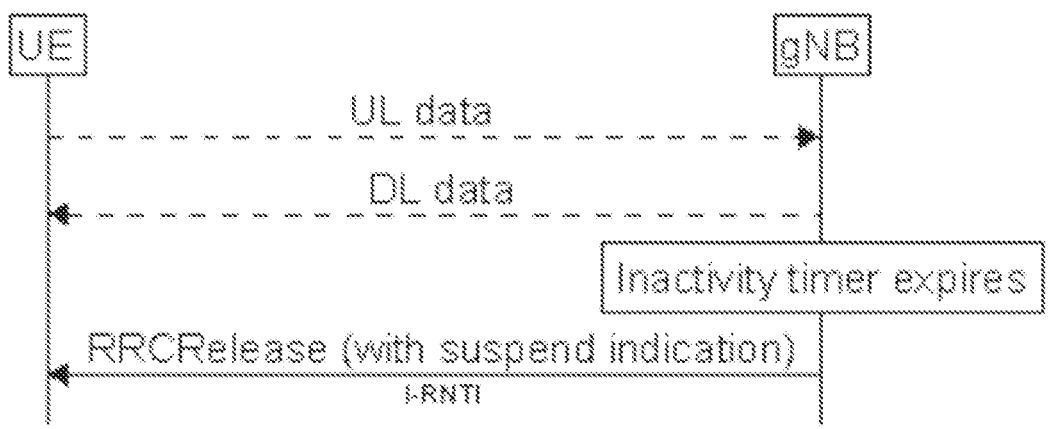
FIG. 1B shows example RRC messaging between a UE and an NR base station (gNB) to suspend a connection.
Figure 1C:
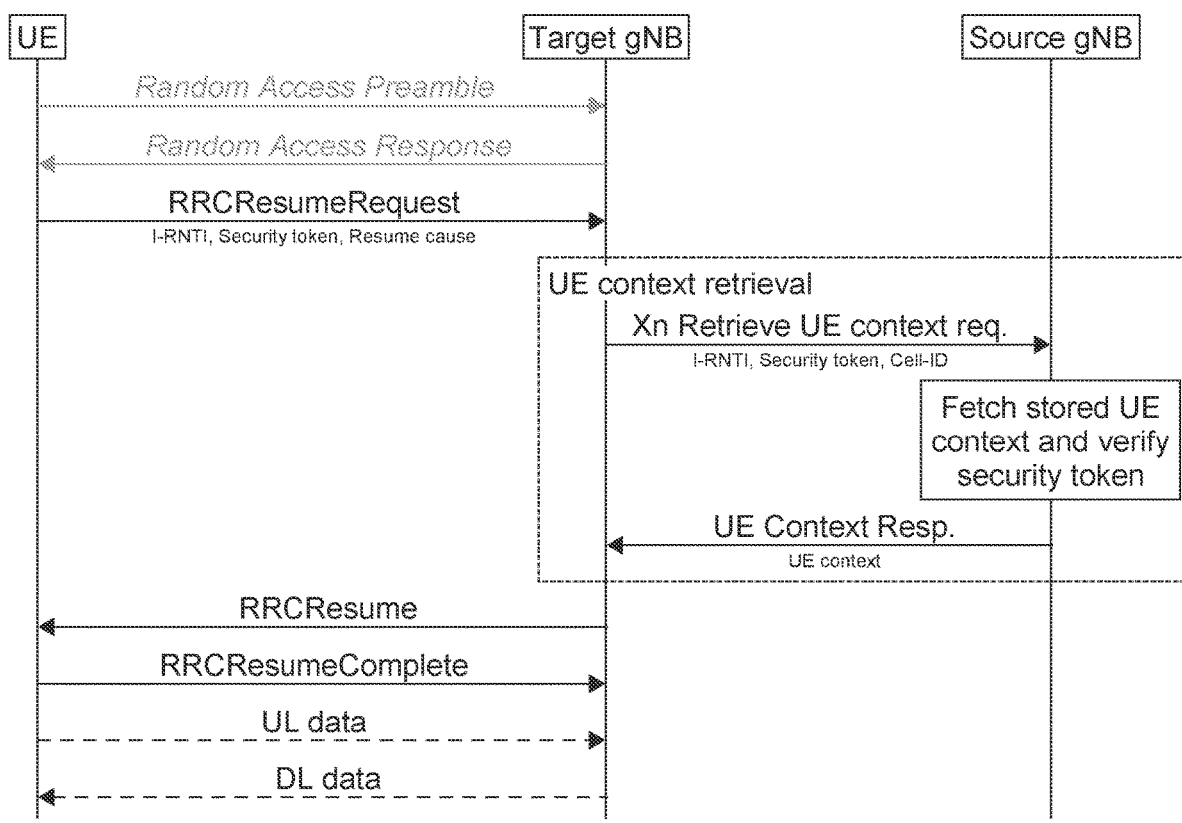
FIG. 1C shows example RRC messaging between a UE and a gNB to resume a connection.
Figure 1D:
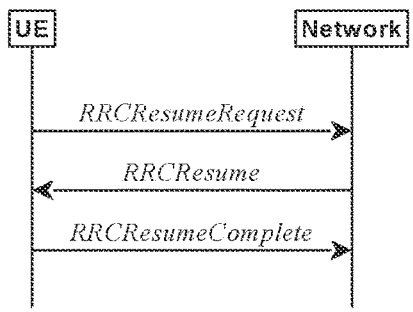
FIG. 1D shows example messaging corresponding to a successful RRC connection resume.
Figure 1E:
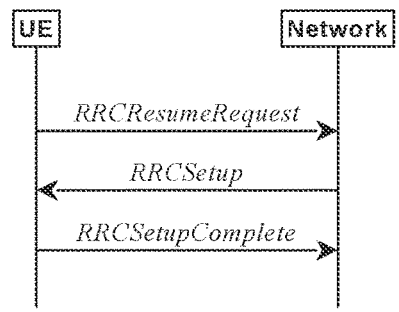
FIG. 1E shows example messaging corresponding to a successful RRC connection resume fallback to RRC connection establishment.
Figure 1F:
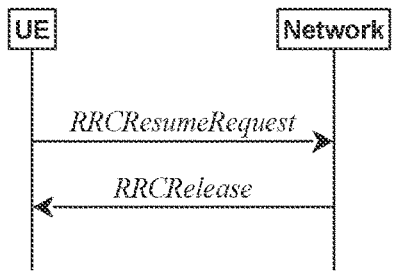
FIG. 1F show s example messaging corresponding to a successful RRC connection resume followed by network release.
Figure 1G:
FIG. 1G shows example messaging corresponding to a successful RRC connection resume followed by network suspend.
Figure 1H:
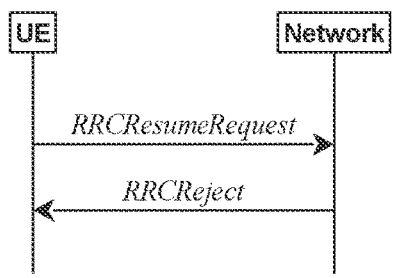
FIG. 1H shows example messaging corresponding to a network rejection of an RRC connection resume request.
Figure 1I:
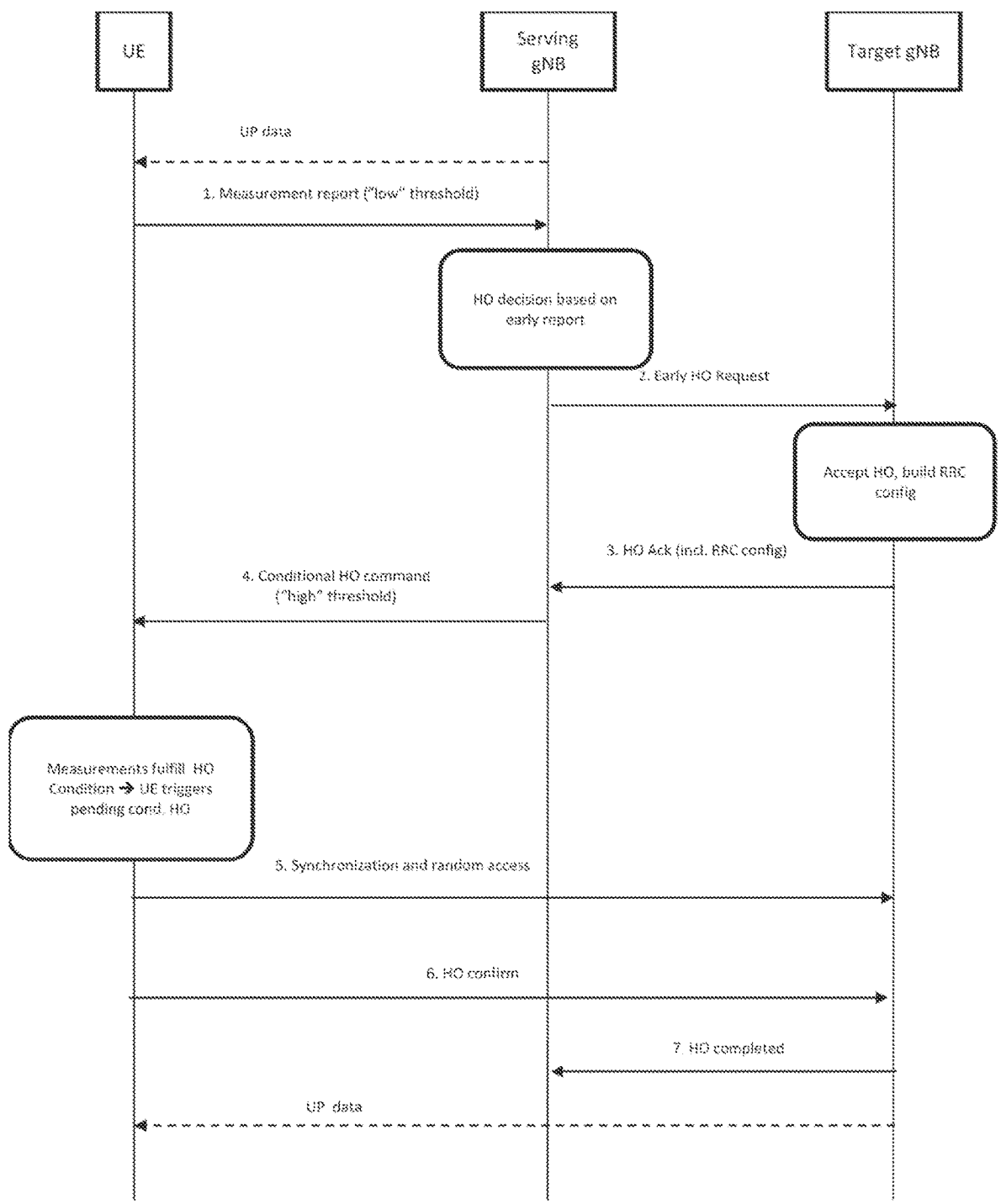
FIG. 1I shows an example conditional handover with a single serving and target cell. In practice there may often be many cells or beams that the UE reported as possible candidates based on its preceding RRM measurements.
Figure 1J:
FIG. 1J shows a successful operation corresponding to handover preparation.
Figure 1K:
FIG. 1K shows an unsuccessful operation corresponding to handover preparation.
Figure 1L:
FIG. 1L shows a successful operation corresponding to handover cancel.
Figure 1M:
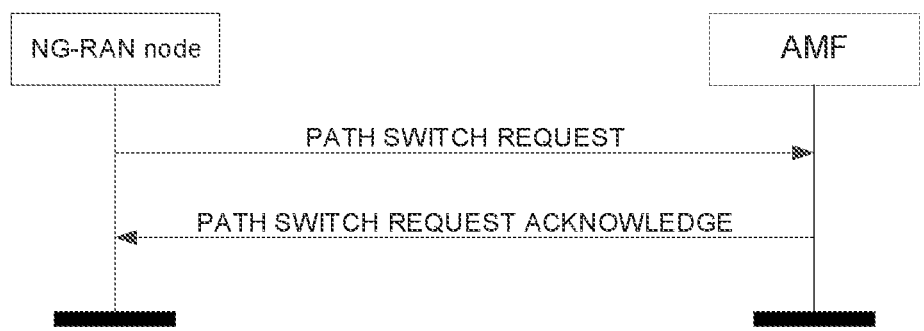
FIG. 1M shows a successful operation corresponding to a path switch request.
Figure 1N:
FIG. 1N shows a successful operation for handover corresponding to a UE Context Release.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein, rather, these embodiments are provided by way of example to convey the scope of the subject matter to those skilled in the art.

In current RRC specifications, the UE transitions from RRC_CONNECTED to RRC_INACTIVE upon the reception of an RRCRelease message containing a suspend configuration (suspendConfig). According to that procedure, two types of parameters are stored. The first type of parameters are the ones provided in the RRCRelease message, and they are stored to be used while the UE is in inactive state or idle state, or upon the transition to back to a connected state.

Other type of parameters that are stored upon the reception of the RRCRelease message are the ones the UE has received in RRC_CONNECTED and that are meant to be used when the UE resumes. These procedures are shown in the below portions from TS 38.331.

5.3.8.3 Reception of the RRCRelease by the UE
The UE shall:
. . .
1> if the RRCRelease message includes the cellReselectionPriorities:
  2> store the cell reselection priority information provided by the cellReselectionPriorities;
  2> if the T320 is included:
    3> start timer T320, with the timer value set according to the value of t320;
1> else;
  2> apply the cell reselection priority information broadcast in the system information;
1> if deprioritisationReq is included;
  2> start or restart timer T325 with the timer value set to the deprioritisationTimer signalled;
  2> store the deprioritisationReq until T325 expiry;
1> if the RRCRelease includes suspendConfig;
  2> apply the received suspendConfig;
  2> reset MAC and release the default MAC Cell Group configuration, if any;
  2> re-establish RLC entities for SRB1;

2> if the RRCRelease message with suspendConfig was received in response to an RRCResumeRequest or an RRCResumeRequest1;
   3> stop the timer T319 if running;
   3> in the stored UE Inactive AS context:
      4> replace the $K_{gNB}$ and $K_{RRCint}$ keys with the current $K_{gNB}$ and $K_{RRCint}$ keys;
      4> replace the C-RNTI with the temporary C-RNTI in the cell the UE has received the RRCRelease message:
      4> replace the cellIdentity with the cellIdentity of the cell the UE has received the RRCRelease message;
      4> replace the physical cell identity with the physical cell identity of the cell the UE has received the RRCRelease message;
      4> replace the suspendConfig with the current suspendConfig;
2> else;
   3> store in the UE Inactive AS Context the received suspendConfig, all current parameters configured with RRCReconfiguration or RRCResume, the current $K_{gNB}$ and $K_{RRCint}$ keys, the ROHC state, the C-RNTI used in the source PCell, the cellIdentity and the physical cell identity of the source PCell[.]

Conditional handover configurations, as explained above, consist at least of RRCReconfiguration(s) messages prepared by target node candidates for target cell candidates and triggering conditions to be monitored in connected mode. When suspend functionality was designed, such a function did not exist. Hence, a problem in conventional techniques is that it is unclear what the UE shall do with the conditional handover (CHO) related configurations received in RRC_CONNECTED upon going to RRC_INACTIVE. Consequently, it is also unclear in conventional techniques what happens when the UE resumes.

Figure 2:
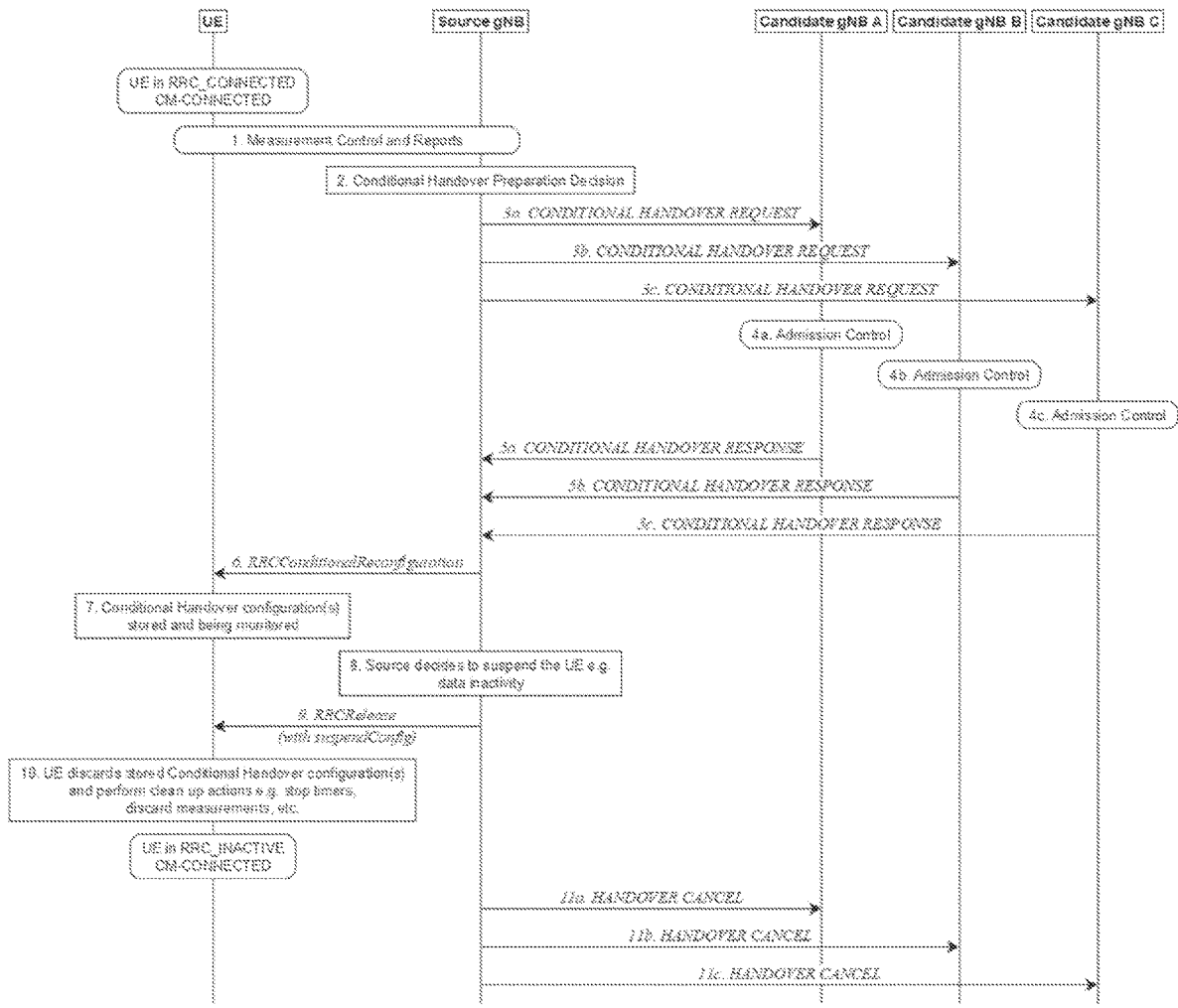
FIG. 2 is a sequence diagram illustrating a UE and network node handling conditional handover configurations when entering a sleeping state and transitioning a UE from a connected state to a sleeping state, according to some examples.

FIG. 2 shows an example corresponding to the below UE and network node methods for handling conditional handover configurations when entering a sleeping state and transitioning a UE from a connected state to a sleeping state.

The present disclosures provide a method at a UE (user equipment, wireless terminal) for handling conditional handover configurations when entering a sleeping state (for example, RRC_IDLE, RRC_INACTIVE or any other protocol state optimized for power savings), the method comprising.
   Receiving and storing, at step 7, one or multiple conditional handover configuration(s) from a source network node where each of these configurations are associated to a target cell candidate, for example, while the UE is in RRC_CONNECTED;
   Discarding (for example, deleting, removing, and so forth), at step 10, conditional handover configuration(s) upon transitioning from connected (for example, RRC_CONNECTED) to a sleeping state (for example, RRC_INACTIVE or RRC_IDLE) and releasing associated resources, for example, upon the reception of an RRCRelease message (or any other trigger for connected to sleep state transition); and
   Performing, at step 10, a set of cleanup actions related to conditional handover procedures such as discarding state variables (for example, counters, and so forth), discarding related measurements (for example, the ones the UE was monitoring for the triggering conditions), stopping the monitoring of conditional handover conditions, stopping timers associated to conditional handover procedures (such as validity resource timers, failure timers, and so forth).

The present disclosures also provide a method at a source network node transitioning a UE from a connected state (for example, RRC_CONNECTED) to a sleeping state (for example, RRC_IDLE, RRC_INACTIVE or any other protocol state optimized for power savings), the method comprising:
   Transmitting (or sending), at step 9, a message to suspend to inactive or release to idle a UE (for example, an RRCRelease message with or without suspend configuration) that has stored conditional handover configuration(s), where each of these conditional handover configurations are associated to a target cell candidate;
   Discarding (for example, deleting) conditional handover configurations) that were provided to that UE so that these specific configurations considered are not part of the stored UE AS Context, or considered as part of the stored RRC configuration, upon transitioning from connected (for example, RRC_CONNECTED) to a sleeping state (for example, RRC_INACTIVE or RRC_IDLE), and
   Informing, at steps 11a, 11b, and/or 11c, at least one target node candidate prepared with conditional handover configurations), possibly including an indication that the UE has been suspended or released, so that upon the reception of that information the target node candidates may discard conditional handover configuration(s) and/or free resources allocated for conditional handover That step may be done in case there is at least a target node candidate cell in another node, which is not needed in the case the CHO is configured only for intra-node cells (for example, when there is a same CU or same DU).

Steps 7, 9, 10, 11a, 11b, and 11c that described above are shown in FIG. 2 in the context of other actions that may be formed relating to the handover, such as providing measurement control and reports (step 1), a conditional handover preparation decision (step 2), a conditional handover request (steps 3a, 3b, and/or 3c), admission control (steps 4a, 4b, and/or 4c), conditional handover response (steps 5a, 5b, and/or 5c), RRCConditionalReconfiguration (step 6), and deciding to suspend the UE (step 8).

Figure 3:
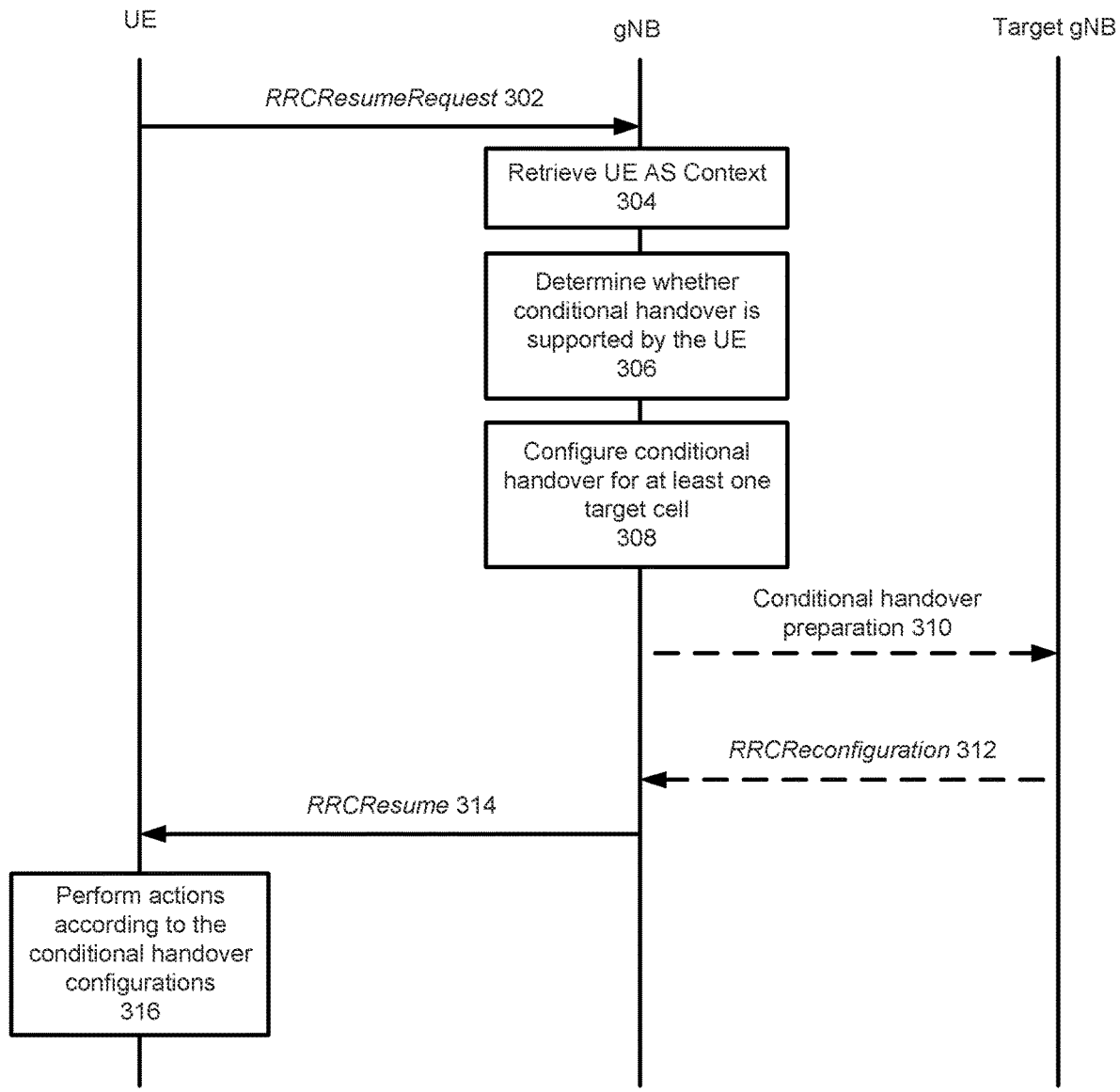
FIG. 3 is a sequence diagram illustrating a UE and network node setting up conditional handover and transitioning a UE from a sleeping state to a connected state, accordingly to some examples.

FIG. 3 shows an example corresponding to the below UE and network node methods for setting up conditional handover transitioning a UE from a sleeping state to a connected state.

The present disclosures provide a method at the UE (user equipment, wireless terminal) for setting up conditional handover transitioning from a sleeping state (for example, RRC_IDLE, RRC_INACTIVE or any other protocol state optimized for power savings) to a connected state (for example, RRC_CONNECTED), the method comprising:
   At step 302, transmitting an RRC resume request like message;
   At step 314, receiving an RRC resume like message containing conditional handover configuration(s); and
   At step 316, performing actions according to the conditional handover configuration(s).

The present disclosures provide a method at a source node for setting up conditional handover at the UE (user equipment, wireless terminal) transitioning from a sleeping state (for example, RRC_IDLE, RRC_INACTIVE or any other protocol state optimized for power savings) to a connected state (for example, RRC_CONNECTED), the method comprising:
   At step 302, receiving an RRC resume request like message;

At step 304, retrieving the UE Access Stratum (AS) Context;

At step 306, determining that conditional handover is supported by the UE trying to resume, for example, based on UE capabilities indicating the support of conditional handover contained at the UE AS context;

At step 308, deciding to configure conditional handover to that UE for at least one target cell candidate cell-X with a condition related to measurement information, for example, similar to an A3 event;

In the case of an inter-node conditional handover (as opposed to an intra-node conditional handover), at step 310 initiating a conditional handover preparation procedure for a target cell to at least one target node (for example, by transmitting a conditional handover preparation message) and, receiving at step 312 in response from at least one target node an RRCReconfiguration message for conditional handover; and At step 314, transmitting to the UE an RRC resume like message containing conditional handover.

As described herein, the present disclosure provides techniques to define a behavior in case a UE is configured with conditional handovers) entering a sleeping state (for example, RRC_IDLE, RRC_INACTIVE, etc.) and subsequently resumes to a RRC_CONNECTED state. Without these techniques, there would be ambiguity whether a UE with previous conditional handover configurations would keep and apply these upon resuming a connection or whether it would delete the configurations. If there is a mismatch between the network behavior and the UE behavior (for example, if the UE stores and resumes the conditional handover configurations while the network releases them) the UE would experience a handover failure once it returns to RRC_CONNECTED and executes a conditional handover.

Similarly, if the UE releases the conditional handover configurations, while the network maintains them with reserved resources, these resources would not be available for other UEs (which is a waste of resources), and the network could attempt to provide delta configurations on top of the conditional handover configurations which it has assumed that the UE has maintained. If the UE applies these incomplete delta configurations, it will fail if it attempts to execute a conditional handover. If the UE simply ignores these delta configurations, this results in unnecessary network signaling.

Accordingly, due to the techniques described herein, there is no ambiguity or mismatch between the UE and the network in terms of the UE AS Context when it comes to the conditional handover configuration(s) that were received by the UE in RRC_CONNECTED. Accordingly, when the UE resumes after being in the sleeping state (for example, inactive state or idle), the UE does not try to restore the conditional handover configuration(s) when resuming, which could be one possible mistaken interpretation if the method is not applied.

In more detail regarding handover, a UE configured with a set of conditional RRCReconfiguration(s) executes a handover (or conditional handover, depending on what the procedure will be called in NR RRC specifications) when the condition for the handover is fulfilled. Configuring a UE with a set of conditional RRCReconfigurations is described further in P76252—U.S. Prov. App. No. 62/754,198, entitled "Method for Configuration of CHO" (which is herein incorporated by reference in its entirety). In some examples, a conditional handover related configuration(s) are for a cell, list of cell(s), measurement object(s) or frequencies. In the case of the cell association, they may be for the same RAT or for a different RAT.

In the context of this disclosure, conditional handover related configuration(s) for a cell may include at least the following:

An RRCReconfiguration like message (or any message with equivalent content), possibly containing a reconfigurationWithSync using NR terminology (defined in 38.331 specifications) and prepared by target node candidates. Or, using the E-UTRA terminology, an RRCConnectionReconfiguration with mobilityControlInfo (defined in 36.331 specifications);

Triggering condition(s) configuration, for example, something like A1-A6 or B1-B2 (inter-RAT events) triggering events (as defined in 38.331/36.331 in reportConfig) where instead of triggering a measurement report it would trigger a conditional handover; and Other conditional handover controlling parameters, for example, a timer defining the validity of target node candidate resources, and so forth.

In the present disclosure, a conditional handover may also be called a conditional reconfiguration with sync. In NR terminology, the handovers are typically called an RRCReconfiguration with a reconfigurationWithSync (field containing configuration to execute a handover, like target information such as frequency, cell identifier, random access configuration, and so forth). In E-UTRA terminology, the handovers are typically called an RRCConnectionReconfiguration with a mobilityControlInfo (field containing configuration to execute a handover).

UE (and network) actions may be performed in NR or E-UTRA environments, for example, the configuration of a conditional HO received in NR for NR cells, where the UE is suspended in NR and the UE resumes in NR. However, the methods are also applicable when any of these steps occurs in different RATs, for example:

UE is configured with a conditional HO in E-UTRA (for candidate NR and E-UTRA cells), UE is suspended in E-UTRA, but UE resumes in E-UTRA;

UE is configured with a conditional HO in NR (for candidate NR and LTE cells), UE is suspended in NR, but UE resumes in E-UTRA;

UE is configured with a conditional HO in E-UTRA (for candidate NR and E-UTRA cells), UE is suspended in E-UTRA, but UE resumes in NR, or in more general terms, the UE is configured with a condition HO in RAT-1 for cells in RAT-1 or RAT-2, the UE is suspended in RAT-1, but the UE resumes in RAT-2.

The method is described in the context of conditional handover (or at least the described configurations to be handled in suspend/resume procedure is about CHO configuration(s)), which should not be interpreted as a limiting factor. The method may also be applicable for handovers triggered by the reception of an RRCReconfiguration message with a reconfigurationWithSync without any condition associated (or RRCConnectionReconfiguration with a mobilityControlInfo).

In the context of the present disclosure, examples of a sleeping state include RRC_IDLE, RRC_INACTIVE or any other protocol state designed with procedures for battery-savings and slower access, relative to a connected state where the protocol actions are designed for faster access and/or data transmission.

Detailed Description of UE Suspend Procedure with CHO

Figure 4:
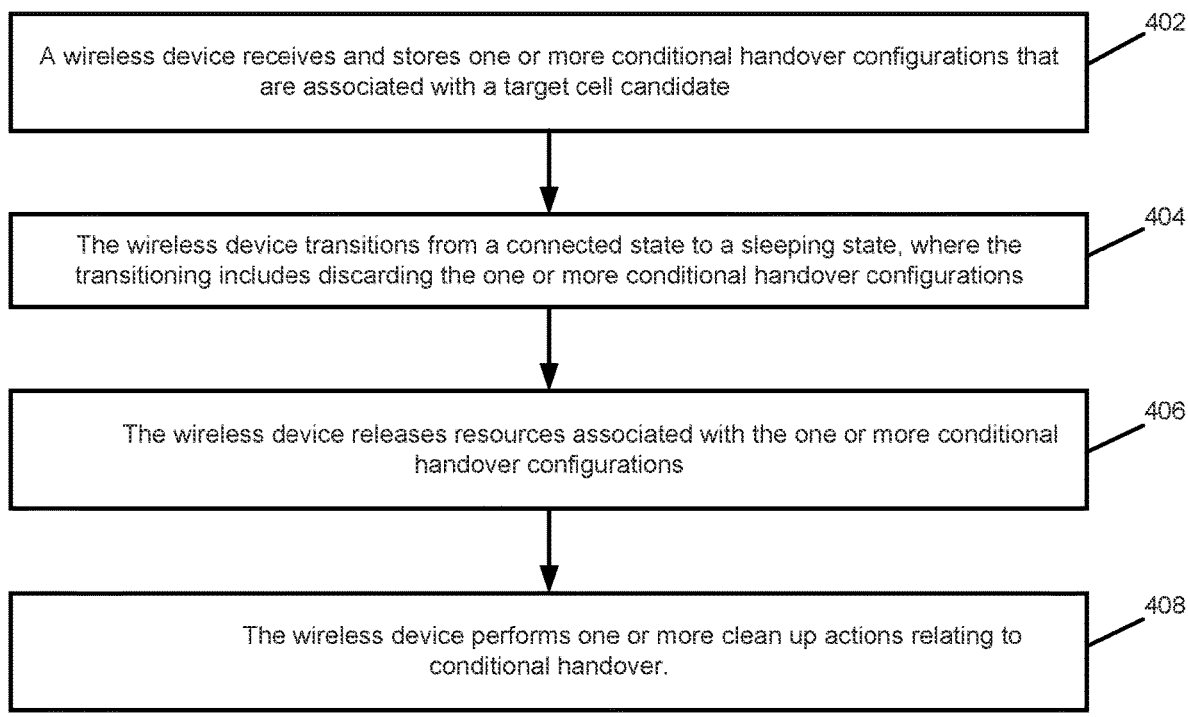
FIG. 4 is a flow diagram illustrating a method performed by a wireless device for handling conditional handover configurations, according to some examples.

FIG. 4 is a flow diagram illustrating a method performed by a wireless device (such as a UE) for handling conditional handover configurations, according to some examples.

At step 402, the wireless device receives, from a source network node, and stores one or more conditional handover configurations. In some examples, these conditional handover configurations are received while the wireless devices is in a connected state Each of the one or more handover configurations is associated with a target cell candidate.

At step 404, the wireless device transitions from a connected state to a sleeping state and discards the one or more conditional handover configurations. In the present example, the discarding includes deleting, removing, releasing, and so forth, of the conditional handover configuration(s) upon transitioning from the connected state to the sleeping state.

In some examples, discarding of conditional handover configurations includes.
  Determining what is stored in sleeping state and adding an exception for the conditional handover configuration (for example, indicating that the conditional handover configuration shall not be stored);
  Deleting conditional handover configurations: and/or
  Including the conditional handover configuration(s) as part of the stored AS Context that is later deleted, once the UE enters RRC_CONNECTED from RRC_INACTIVE. In that case, the timing to delete the conditional handover configuration(s) is when the UE requests to resume the connection or when it enters RRC_CONNECTED again.

There are various examples regarding the triggering point for discarding conditional handover configuration(s). These triggering points include:
  The transition from connected to sleeping state (for example, RRC_CONNECTED to RRC_INACTIVE). The actions may be started upon the reception of an RRCRelease message containing a suspend configuration, field suspendConfig (which is an indication that the UE shall transition to RRC_INACTIVE instead of RRC_IDLE);
  The transition from connected to sleeping state. The actions may be started upon the reception of an RRCRelease message not containing a suspend configuration, field suspendConfig (which is an indication that the UE shall transition to RRC_INACTIVE instead of RRC_IDLE). In other examples, upon the expiry of a data inactivity timer the UE in connected state shall transition to idle and trigger NAS recovery. In that case, the UE shall discard any stored conditional handover configuration(s);
  The initiation of transitioning from the sleeping state (for example, RRC_INACTIVE) to connected mode (RRC_CONNECTED), for example upon initiating transmission of an RRCResumeRequest message. The exact initiation may either be upon the transmission of the request like message or during the preparations, before the message is transmitted but is already known that the UE will transmit it; and/or
  The completion of transitioning from the sleeping state (for example, RRC_INACTIVE) to connected mode (RRC_CONNECTED), for example upon reception of an RRCResume message or transmission of an RRCResumeComplete message.

At step 406, the wireless device releases resources associated with the one or more conditional handover configurations. In some examples, the releasing of the resources is performed upon reception of a RRC release message by the wireless device.

At step 408, the wireless device performs one or more clean up actions relating to conditional handover. In some examples, the one or more clean up actions include one or more of: discarding state variables (for example, counters, and so forth); discarding measurements that were monitored for conditional handover conditions; stopping monitoring corresponding to conditional handover conditions; or stopping timers associated with conditional handover procedures (such as validity resource timers, failure timers, and so forth).

An example of a state variable related to conditional handover configurations) is a validity timer that may be configured to the UE to indicate for how long resources prepared by a target node candidate cell and/or node are valid, such as random-access channel (RACH) resources. Each target cell candidate prepares an RRCReconfiguration like message (possibly with a reconfiguration WithSync) and provides to the UE (via source node) with a triggering condition configuration (for example, an A3 like event with threshold values, a measurement trigger quantity like RSRP, RSRQ or SINR, time to trigger, etc.) and, the timer is started upon the reception of that conditional handover configuration. Then, when the UE transitions from connected to sleeping state (for example, RRC_INACTIVE) while these timers are running (for example, one per target cell candidate or a common timer for all, to indicate validity of the whole configuration for all target node candidates), according to the method the UE stops these validity resource timer(s), to avoid the UE to discard these configurations while the UE is in RRC_INACTIVE or even to bother about these configurations in RRC_INACTIVE or any other sleeping state.

In some examples, as part of these clean up actions, the method includes that the UE stops monitoring the triggering conditions (for example, A3 like events associated with a set of one or more cells in a frequency) and stops performing the required measurements associated to the triggering condition. These actions can either be modelled as an independent step taken upon the transition to inactive (i.e. not related to the timer), as a step taken upon transitioning from inactive to connected, or as an action to be taken upon the stopping (or expiry) of the candidate target resource validity timer(s) described above, possibly captured as a separated sub-clause in the RRC specifications.

Below is an example of how the described action may be implemented in the NR RRC specifications TS 38.331, for the example where the triggering point to start the method is the reception of RRCRelease.

5.3.8.3 Reception of the RRCRelease by the UE
The UE shall:
1> delay the following actions defined in this sub-clause 60 ms from the moment the RRCRelease message was received or optionally when lower layers indicate that the receipt of the RRCRelease message has been successfully acknowledged, whichever is earlier:
1> stop timer T380, if running;
1> stop timer T320, if running;
1> stop timer T390, if running;
1> stop conditional handover timer(s), if running, and stop monitoring the triggering conditions for conditional handovers);
1> discard stored conditional handover configuration(s) or any configuration received in the RRCConditionalReconfiguration;

1> if the security is not activated, perform the actions upon going to RRC_IDLE as specified in 5.3.11 with the release cause 'other' upon which the procedure ends;
1> if the RRCRelease message includes redirectedCarrierInfo indicating redirection to eutra:
  2> if cnType is included;
    3> after the cell selection, indicate the available CN Type(s) and the received cnType to upper layers;
NOTE: Handling the case if the E-UTRA cell selected after the redirection does not support the core network type specified by the cnType, is up to UE implementation.
1> if the RRCRelease message includes the cellReselectionPriorities;
  2> store the cell reselection priority information provided by the cellReselectionPriorities;
  2> if the t320 is included:
    3> start timer T320, with the timer value set according to
the value of t320;
1> else:
  2> apply the cell reselection priority information broadcast in the system information;
1> if deprioritisationReq is included:
  2> start or restart timer T325 with the timer value set to the deprioritisationTimer signalled;
  2> store the deprioritisationReq until 1325 expiry;
1> if the RRCRelease includes suspendConfig;
  2> apply the received suspendConfig;
  2> reset MAC and release the default MAC Cell Group configuration, if any;
  2> re-establish RLC entities for SRB1;
  2> if the RRCRelease message with suspendConfig was received in response to an RRCResumeRequest or an RRCResumeRequest1:
    3> stop the timer T319 if running;
    3> in the stored UE Inactive AS context:
      4> replace the $K_{gNB}$ and $K_{RRCint}$ keys with the current $K_{gNB}$ and $K_{RRCint}$ keys;
      4> replace the C-RNTI with the temporary C-RNTI in the cell the UE has received the RRCRelease message;
      4> replace the cellIdentity with the cellIdentity of the cell the UE has received the RRCRelease message;
      4> replace the physical cell identity with the physical cell identity of the cell the UE has received the RRCRelease message;
      4> replace the suspendConfig with the current suspendConfig:
  2> else:
    3> store in the UE Inactive AS Context the received suspendConfig, alt current parameters configured with RRCReconfiguration or RRCResume (except conditional handover configuration(s)), the current $K_{gNB}$ and $K_{RRCint}$ keys, the ROHC state, the C-RNTI used in the source PCell, the cellIdentity and the physical cell identity of the source PCell;
  2> suspend all SRB(s) and DRB(s), except SRB0;
  2> indicate PDCP suspend to lower layers of all DRBs;
  2> if the t380 is included:
    3> start timer T380, with the timer value set to t380;
  2> if the RRCRelease message is including the waitTime;
    3> start timer T302 with the value set to the waitTime;
    3> inform the upper layer that access barring is applicable for all access categories except categories '0' and '2';
  2> indicate the suspension of the RRC connection to upper layers;
  2> enter RRC_INACTIVE and perform cell selection as specified in TS 38.304 [20];
1> else
  2> perform the actions upon going to RRC_IDLE as specified in 5.3.11, with the release cause 'other'.

In some examples, the wireless device further performs operations including transmitting a Radio Resource Control, RRC, resume request message; receiving an RRC resume message including at least one conditional handover configuration; and performing one or more actions responsive to the received conditional handover configuration.

Detailed Description of a Network Suspend Procedure

Figure 5:
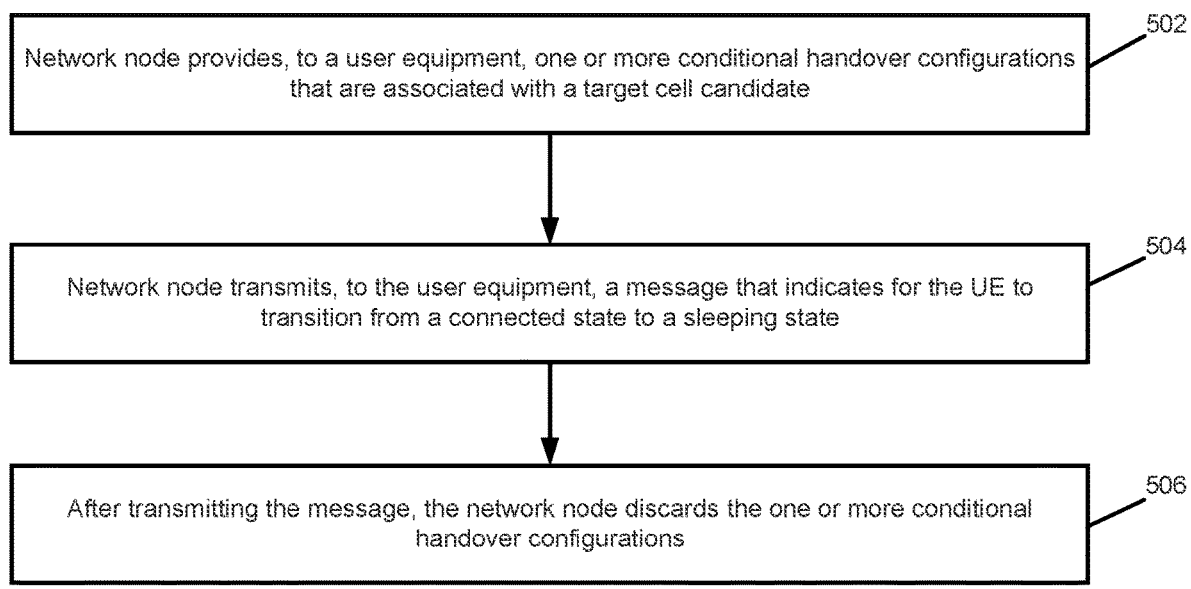
FIG. 5 is a flow diagram illustrating a method performed by a network node for handing conditional handover configurations relating to a user equipment that is being transitioned from a connected state to a sleeping state, according to some examples.

FIG. 5 is a flow diagram illustrating a method performed by a network node for handing conditional handover configurations relating to a user equipment that is being transitioned from a connected state to a sleeping state, according to some examples.

At step 502, the network node provides, to a UE, one or more conditional handover configurations that are each associated with a target cell candidate.

In some examples, prior to providing the conditional handover configurations to the UE, the network node obtains the conditional handover configurations by transmitting a conditional handover preparation message to one or more target node candidates corresponding to the target cell and receiving, from at least one of the one or more target node candidates, an RRC message including the conditions for conditional handover.

At step 504, the network node transmits, to the UE, a message to transition from a connected state to a sleeping state. In some examples, the message is an RRCRelease message, with or without suspend configuration, that has stored conditional handover configuration(s), where each of these conditional handover configurations are associated with a target cell candidate.

At step 506, after transmitting the message, the network node discards the one or more conditional handover configurations that were provided to that UE This discarding may be performed so that these specific configurations considered are not part of a stored UE AS Context, upon transitioning from a connected to a sleeping state.

Another action the network node may take is to inform at least one target node candidate prepared with conditional handover configuration(s), possibly including an indication that the UE has been suspended or released, so that upon the reception of that information the target node candidates may discard conditional handover configuration(s) and/or free resources allocated for conditional handover. This action is taken if the UE is prepared with conditional handover configurations to cell(s) belonging to nodes other than the source node. In case the UE is configured with conditional handover configurations to cell(s) belonging to the source node, this action will node be taken. This action may be implemented by triggering a handover cancel procedure from source to a prepared target node candidate, possibly including a cause value as the indication that the UE is being suspended.

In some examples, method also includes the network node receiving an RRC resume request message: determining, based on an Access Stratum (AS) context corresponding to the UE, that conditional handover is supported by the UE; configuring a conditional handover configuration for the UE, the conditional handover configuration corresponding to at least one target cell: and transmitting, to the UE, an RRC resume message including the configured conditional handover configuration.

Additionally, the present disclosure provides a method at a network node that is a target node candidate for conditional handover, the method comprising releasing its prepared resources for incoming conditional handovers upon the reception of the indication from a source network node that the UE is transitioning to a sleeping state, for example, idle or inactive.

Detailed Description of UE Resume Procedure

The present disclosure provides a method at the UE (user equipment, wireless terminal) for setting up conditional handover while it is transitioning from a sleeping state (for example, RRC_IDLE, RRC_INACTIVE or any other protocol state optimized for power savings) to a connected state (for example, RRC_CONNECTED), the method comprising the transmission of an RRCResumeRequest like message and the reception an RRCResume like message containing conditional handover configurations).

Using NR RRC terminology, the RRC resume like message may be an RRCResume message that includes fields/IEs with the similar fields/IEs used to configure a conditional handover. In LTE terminology this would be an RRCConnectionResume message.

Alternative a)

The fields and IES for conditional handover have not been agreed in a 3GPP specification. As these fields/IEs are not yet specified, conditional handover may be configured, for example, as a list of configurations, each associated to a target cell candidate, and each associated to a triggering condition (that may possibly point to an existing measurement configured to at the UE). Conditional handover configurations are described in more detail P76252—U.S. Prov. App. No. 62/754,198, entitled "Method for Configuration of CHO" (which is herein incorporated by reference in its entirety).

The configurations may include those specified in P76369—U.S. Prov. App. No. 62/760,425, entitled "Measurement Configuration for Conditional Mobility" (which is herein incorporated by reference in its entirety). In more general terms, conditional handover configurations include at least an RRCReconfiguration like message, possibly containing a reconfigurationWithSync and a triggering condition containing parameters similar to the ones in event trigger events (like A3, A2, A1, etc.) and some resource control parameters, like a validity timer for target node candidate resources.

Below is an example of an RRConditionalReconfiguration message. The RRCConditionalReconfiguration message is a command to modify an RRC connection upon the triggering of an associated condition. It may convey information for measurement configuration, mobility control, radio resource configuration (including RBs, MAC main configuration and physical channel configuration) including and security configuration.

Signalling radio bearer: SRB1 or SRB3
RLC-SAP: AM
Logical channel: DCCH
Direction: Network to UE RRCConditionalReconfiguration Message

```
-- ASN1START
-- TAG-RRCCONDITIONALRECONFIGURATION-START
RRCCONDITIONALReconfiguration ::=                             SEQUENCE {
    rrc-TransactionIdendfier       RRC-TransactionIdentifier,
    criticalExtensions   CHOICE {
        rrcConditionalReconfiguration          RRCConditionalReconfiguration-IEs,
        criticalExtensionsFuture       SEQUENCE { }
    }
}
RRCConditionalReconfiguration-IEs ::=                         SEQUENCE {
    condReconfigurationList    SEQUENCE (SIZE (1..maxCondReconfigurations)) OF CondReconfiguration,
    ...
}
CondReconfiguration ::=                        SEQUENCE {
    rrcReconfigurationToApply           OCTET STRING (CONTAINING RRCReconfiguration),
    eventTriggerCHO                     ReportConfigNR,
    ...
}
    lateNonCriticalExtension            OCTET STRING        OPTIONAL,
    nonCriticalExtension                RRCReconfiguration-v1530-IEs OPTIONAL
}
-- TAG- RRCCONDITIONALRECONFIGURATION -STOP
-- ASN1STOP
```

ReportConfigNR

ReportConfigNR specifies criteria for triggering of an NR measurement reporting event. Measurement reporting events are based on cell measurement results, which can either be derived based on SS/PBCH block or CSI-RS. These events are labelled AN with N equal to 1, 2 and so on.

Event A1: Serving becomes better than absolute threshold;
Event A2: Serving becomes worse than absolute threshold:
Event A3: Neighbour becomes amount of offset better than PCell/PSCell;

Event A4: Neighbour becomes better than absolute threshold;
Event A5: PCell/PSCell becomes worse than absolute threshold1 AND Neighbour/SCell becomes better than another absolute threshold2.

Event A6: Neighbour becomes amount of offset better than SCell.

ReportConfigNR Information Element

```
-- ASN1START
-- TAG-REPORT-CONFIG-START
ReportConfigNR ::=              SEQUENCE {
    reportType                  CHOICE {
        periodical                  PeriodicalReportConfig,
        eventTriggered                  EventTriggerConfig,
        ...,
        reportCGI                   ReportCGI
    }
}
ReportCGI ::=   SEQUENCE {
    cellForWhichToReportCGI     PhysCellId,
    ...
}
EventTriggerConfig::=           SEQUENCE {
    eventId                     CHOICE {
        eventA1                     SEQUENCE {
            a1-Threshold                    MeasTriggerQuantity,
            reportOnLeave                       BOOLEAN,
            hysteresis                      Hysteresis,
            timeToTrigger                       TimeToTrigger
        },
        eventA2                     SEQUENCE {
            a2-Threshold                    MeasTriggerQuantity,
            reportOnLeave                       BOOLEAN,
            hysteresis                      Hysteresis,
            timeToTrigger                       TimeToTrigger
        },
        eventA3                     SEQUENCE {
            a3-Offset                       MeasTriggerQuantityOffset,
            reportOnLeave                       BOOLEAN,
            hysteresis                      Hysteresis,
            timeToTrigger                       TimeToTrigger,
            useWhiteCellList                    BOOLEAN
        },
        eventA4                     SEQUENCE {
            a4-Threshold                    MeasTriggerQuantity,
            reportOnLeave                       BOOLEAN,
            hysteresis                      Hysteresis,
            timeToTrigger                       TimeToTrigger,
            useWhiteCellList                    BOOLEAN
        },
        eventA5                     SEQUENCE {
            a5-Threshold1                       MeasTriggerQuantity,
            a5-Threshold2                       MeasTriggerQuantity,
            reportOnLeave                       BOOLEAN,
            hysteresis                      Hysteresis,
            timeToTrigger                       TimeToTrigger,
            useWhiteCellList                    BOOLEAN
        },
        eventA6                     SEQUENCE {
            a6-Offset                       MeasTriggerQuantityOffset,
            reportOnLeave                       BOOLEAN,
            hysteresis                      Hysteresis,
            timeToTrigger                       TimeToTrigger,
            useWhiteCellList                    BOOLEAN
        },
        ...
    },
    rsType                  NR-RS-Type,
    reportInterval          ReportInterval,
    reportAmount                ENUMERATED {r1, r2, r4, r8, r16, r32, r64, infinity},
    reportQuantityCell          MeasReportQuantity,
    maxReportCells              INTEGER (1..maxCellReport),
    reportQuantityRsIndexes         MeasReportQuantity
        OPTIONAL,   -- Need R
    maxNrofRSIndexesToReport                        INTEGER (1..maxNrofIndexesToReport)
        OPTIONAL,   -- Need R
    includeBeamMeasurements                 BOOLEAN,
    reportAddNeighMeas                  ENUMERATED {setup}
        OPTIONAL,   -- Need R
    ...
}
PeriodicalReportConfig ::=                  SEQUENCE {
```

```
rsType                    NR-RS-Type,
    reportInterval            ReportInterval,
    reportAmount              ENUMERATED {r1, r2, r4, r8, r16, r32, r64, infinity},
    reportQuantityCell        MeasReportQuantity,
    maxReportCells            INTEGER (1..maxCellReport),
    reportQuantityRsIndexes        MeasReportQuantity
OPTIONAL, -- Need R
    maxNrotRsIndexesToReport                INTEGER (1..maxNrofIndexesToReport)
OPTIONAL, -- Need R
    includeBeamMeasurements            BOOLEAN,
    useWhiteCellList          BOOLEAN,
    ...
}
NR-RS-Type ::=            ENUMERATED {ssb, csi-rs}
MeasTriggerQuantity ::=        CHOICE {
    rsrp          RSRP-Range,
    rsrq          RSRQ-Range,
    sinr          SINR-Range
}
MeasTriggerQuantityOffset ::=        CHOICE {
    rsrp          INTEGER (-30..30),
    rsrq          INTEGER (-30..30),
    sinr          INTEGER (-30..30)
}
MeasReportQuantity ::=        SEQUENCE {
    rsrp          BOOLEAN,
        rsrq      BOOLEAN,
        sinr      BOOLEAN
}
-- TAG-REPORT-CONFIG-START
-- ASN1STOP
```

If the method assumes this alternative as the one being specified for configuring conditional handover for a UE in RRC_CONNECTED, one possible implementation in the NR specification for the resume method is shown below:

5.3.13.4 Reception of the RRCResume by the UE

The UE shall;

1> stop timer T319;
1> if the RRCResume includes the fullConfig;
   2> perform the full configuration procedure as specified in
5.3.5.11:
1> else:
   2> restore the PDCP state and reset COUNT value far SRB2 and all DRBs;
   2> restore the cellGroupConfig from the stored UE AS context;
   2> indicate to lower layers that stored UEAS context is used;
1> discard the fullI-RNTI, shortI-RNTI and the stored UE AS context, except ran-NotificationAreaInfo;
1> if the RRCResume includes the masterCellGroup:
   2> perform the cell group configuration for the received masterCellGroup according to 5.3.5.5;
Editor's Note; FES Whether it is supported to configure secondaryCellGroup at Resume.
1> if the RRCResume includes the radioBearerConftg:
   2> perform the radio bearer configuration according to 5.3.5.6;
Editor's Note; FES Whether there needs to be a second radioBearerConftg.
1> resume SRB2 and all DRBs;
1> if stored, discard the cell reselection priority information provided by the cellReselectionPriorities or inherited from another RA T;
1> stop timer T320, if running;
1> if the RRCResume message includes the measConfig;
   2> perform the measurement configuration procedure as specified in 5.5.2;
1> resume measurements if suspended;
Editor's Note; FES Whether there is a need to define LIE actions related to access control timers (equivalent to T302, T303, T305, T306, T308 in LTE). For example, informing upper layers if a given timer is not running.
1> enter RRC_CONNECTED;
1> indicate to upper layers that the suspended RRC connection has been resumed;
1> stop the cell re-selection procedure;
1> consider the current cell to be the PCell;
1> if the RRCResume message includes the condReconfigurationList:
   2> store the list of RRCReconfiguration(s) provided in the condReconfigurationList;
   2> starts to monitor each condition eventTriggerCHO in the condReconfigurationList as specified in 5.5.x;
   1> set the content of the of RRCResumeComplete message as follows;
   2> if the upper layer provides NAS PDU, set the dedicatedNAS-Message to include the information received from upper layers;
   2> if the upper layer provides a PLMN, set the selectedPLMN-Identity to PLMN selected by upper layers (TS 24.501 [23]) from the PLMN(s) included in the plmn-IdentityList in SIB1;
   2> if the master CellGroup contains the reportUplinkTxDirectCurrent:
     3> include the uplinkTxDirectCurrentList;
1> submit the RRCResumeComplete message to lower layers for transmission;
1> the procedure ends.

5.3.5.3 Reception of an RRC Reconfiguration by the UE or triggering of conditional handover The UE shall perform the following actions upon reception of the RRCReconfiguration:

1> if the RRCReconfiguration includes the fullConfig;
  2> perform the radio configuration procedure as specified in 5.3.5.11;
1> if the RRCReconfiguration includes the masterCellGroup;
  2> perform the cell group configuration for the received masterCellGroup according to 5.3.5.5;
1> if the RRCReconfiguration includes the masterKeyUpdate:
  2> perform security key update procedure as specified in 5.3.5.7;
1> if the RRCReconfiguration includes the secondaryCellGroup;
  2> perform the cell group configuration for the SCG according to 5.3.5.5;
1> if the RRCReconfiguration message contains the radioBearerConfig:
  2> perform the radio bearer configuration according to 5.3.5.6;
1> if the RRCReconfiguration message includes the measConfig;
  2> perform the measurement configuration procedure as specified in 5.5.2;
1> if the RRCReconfiguration message includes the dedicatedSIB1-Delivery;
  2> perform the action upon reception of SIB1 as specified in 5.2.2.4.2;
1> if the RRCReconfiguration message includes the dedicatedSystemInformationDelivery:
  2> perform the action upon reception of System Information as specified in 5.2.2.4;
1> set the content of RRCReconfigurationComplete message as follows;
  2> if the RRCReconfiguration includes the masterCellGroup containing the reportUplinkTxDirectCurrent, or;
  2> if the RRCReconfiguration includes the secondaryCellGroup containing the reportUplinkTxDirectCurrent:
    3> include the uplinkTxDirectCurrentList;
1> if the UE is configured with E-UTRA nr-SecondaryCellGroupConfig (MCG is E-UTRA):
  2> if RRCReconfiguration was received via SRB1;
    3> submit the RRCReconfigurationComplete via the EUTRA MCG embedded in E-UTRA RRC message RRCConnectionReconftgurationComplete as specified in TS 36.331 [10];
    3> if reconfiguration WithSync was included in spCellConfig of an SCG:
      4> initiate the random access procedure on the spCell, as specified in TS 38.321 [3];
    3> else;
      4> the procedure ends;
NOTE; The order the UE sends the RRCConnectionReconfigurationComplete message and performs the Random Access procedure towards the SCG is left to UE implementation.
  2> else (RRCReconfiguration was received via SRB3);
    3> submit the RRCReconfigurationComplete message via SRB3 to lower layers for transmission using the new configuration:
NOTE: For EN-DC, in the case of SRB1, the random access is triggered by RRC layer itself as there is not necessarily other UL transmission. In the case of SRB3, the random access is triggered by the MAC layer due to arrival of RRCReconfigurationComplete.
1> else:
  2> submit the RRCReconfigurationComplete message via SRB1 to lower layers for transmission using the new configuration:
1> if reconfiguration WithSync was included in spCellConfig of an MCG or SCG, and when MAC of an NR cell group successfully completes a random access procedure triggered above:
  2> stop timer T304 for that cell group;
  2> apply the parts of the CQI reporting configuration, the scheduling request configuration and the sounding RS configuration that do not require the UE to know the SFN of the respective target SpCell, if any:
  2> apply the parts of the measurement and the radio resource configuration that require the UE to know the SFN of the respective target SpCell (for example, measurement gaps, periodic CQI reporting, scheduling request configuration, sounding RS configuration), if any upon acquiring the SFN of that target SpCell;
  2> if the reconfiguration WithSync was included in spCellConfig of an MCG;
    3> if the active downlink BWP, which is indicated by the firstActiveDownlinkBWP-Id for the target SpCell of the MCG, has a common search space configured;
      4> acquire the SIB1 of the target SpCell of the MCG, as specified in 5.2.2.3.1:
  2> the procedure ends.
NOTE: The UE is only required to acquire broadcasted SIB1 if the UE can acquire it without disrupting unicast data reception, i.e. the broadcast and unicast beams are quasi co-located.

5.5.x Conditional mobility triggering
The UE shall:
1> perform the evaluation of the criteria as specified in 5.5.4 for the associated eventTriggerCHO;
  2> if the entry condition applicable for this event is fulfilled for the cell provided in the reconfiguration WithSyncfor all measurements after layer 3 filtering taken during timeToTrigger defined for this event within the VarMeasConfig:
    3> perform actions as specified in 5.3.5.3;

The RRCResume message is used to resume the suspended RRC connection.
Signalling radio bearer: SRB1
RLC-SAP: AM
Logical channel: DCCH
Direction: Network to UE RRCResume Message

```
-- ASN1START
-- TAG-RRCRESUME-START
RRCResume ::=            SEQUENCE {
    rrc-TransactionIdendfier        RRC-TransactionIdentifier,
    criticalExtensions      CHOICE {
        rrcResume               RRCResume-IEs,
```

```
        criticalExtensionsFuture              SEQUENCE { }
    }
}
RRCResume-IEs ::=            SEQUENCE {
    radioBearerConfig          RadioBearerConfig
OPTIONAL, -- Need M
    masterCellGroup            OCTET STRING (CONTAINING CellGroupConfig)
OPTIONAL, -- Need M
    measConfig         MeasConfig                                 OPTIONAL,
-- Need M
    fullConfig   ENUMERATED {true}
OPTIONAL, -- Need N
    lateNonCriticalExtension           OCTET STRING
OPTIONAL,
    nonCriticalExtension       RRCResume-v16xx-IEs
OPTIONAL
RRCResume-v16xx-IEs::=           SEQUENCE {
    condReconfigurationList          SEQUENCE (SIZE (1..maxCondReconfiguratiom)) OF
CondReconfiguration OPTIONAL, -- Need N
...
}
CondReconfiguration::=                              SEQUENCE {
    rrcReconfigurationToApply                         OCTET SIRING (CONTAINING
RRCReconfiguration),
    eventTriggerCHO                                   ReportConfigNR,
...
}
}
-- TAG-RRCRESUME-STOP
-- ASN1STOP
```

| RRCResume-IEs field descriptions |
|---|
| masterCellGroup |
| Configuration of the master cell group (NR Standalone): |
| radioBearerConfig |
| Configuration of Radio Bearers (DRBs, SRBs) including SDAP/PDCP. |

Alternative b)

In alternative b), the conditional configuration for the conditional handover contains a pointer/reference to a stored measurement configuration (for example, measId) that is stored at the UE and that is being resumed upon the reception of RRCResume or, it points to a new measurement configuration (for example, measId) that is being provided in the measConfig in the same RRCResume message containing the conditional handover configurations. This principle is described in further detail P76369—U.S. Prow App. No. 62/760,425, entitled "Measurement Configuration for Conditional Mobility" (which is herein incorporated by reference in its entirety).

In this example, each measurement identifier is associated with a measurement the UE is to perform That identifier is associated to a stored measObject and reportConfig. The measObject frequency associated to each measurement identifier needs to be consistent with the frequency provided in the reconfigurationWithSync associated to each rrcReconfigurationToApply message. That may be guaranteed by a condition in the RRC specifications, otherwise the UE triggers an RRC compliance failure (which leads to an RRC reestablishment procedure). Upon receiving that measId reference, the UE shall monitor at least one triggering condition associated to it, if not already being monitored, and, upon the triggering of the condition, at least trigger the mobility conditional procedure, which includes applying the RRC Reconfiguration message (indicated by the rrcReconfigurationToApply field) including a reconfigurationWithSync (in the case of NR). In E-UTRA, the equivalent would be a mobilityControlInfo.

Example RRCResume Signaling is Shown Below:
5.3.13.4 Reception of the RRCResume by the UE
The UE shall:
1> stop timer T319;
1> if the RRCResume includes the fullConfig;
   2> perform the full configuration procedure as specified in 5.3.5.11;
1> else;
   2> restore the PDCP state and reset COUNT value for SRB2 and all DRBs;
   2> restore the cellGroupConfigfrom the stored UEAS context;
   2> indicate to lower layers that stored UE AS context is used;
1> discard the fullI-RNTI, shortI-RNTI and the stored UE AS context, except ran-NotificationAreaInfo;
1> if the RRCResume includes the masterCellGroup;
   2> perform the cell group configuration for the received masterCellGroup according to 5.3.5.5;
Editor's Note; FFS Whether it is supported to configure secondaryCellGroup at Resume.
1> if the RRCResume includes the radioBearerConfig;
   2> perform the radio bearer configuration according to 5.3.5.6;
Editor's Note; FFS Whether there needs to be a second radioBearerConfig.
1> resume SRB2 and all DRBs;
1> if stored, discard the cell reselection priority information provided by the cellReselectionPriorities or inherited from another RAT:
1> stop timer T320, if running;
1> if the RRCResume message includes the measConfig:
   2> perform the measurement configuration procedure as specified in 5.5.2;
1> resume measurements if suspended;
Editor's Note; FES Whether there is a need to define UE actions related to access control timers (equivalent to T302, T303, T305, T306, T308 in LTE). For example, informing upper layers if a given timer is not running.
1> enter RRC_CONNECTED:
1> indicate to upper layers that the suspended RRC connection has been resumed:
1> stop the cell re-selection procedure:
1> consider the current cell to be the PCell;
1> if the RRCResume message includes the condReconfigurationList:
   2> store the list of RRCReconfiguration(s) provided in the condReconfigurationList;
   2> perform actions as specified in perform the actions as specified in 5.5.x; 1> set the content of the of RRCResumeComplete message as follows;
   2> if the upper layer provides NAS PDV, set the dedicatedNAS-Message to include the information received from upper layers;
   2> if the upper layer provides a PLMN, set the selectedPLMN-Identity to PLMN selected by upper layers (TS 24.501 [23]) from the PLMN(s) included in the plmn-IdentityList in S1B1;
   2> if the masterCellGroup contains the reportUplinkTxDirectCurrent;
      3> include the uplinkTxDirectCurrentList;
1> submit the RRCResumeComplete message to lower layers for transmission;
1> the procedure ends.

5.3.5.3 Reception of an RRCReconfiguration by the UE or triggering of conditional handover The UE shall perform the following actions upon reception of the RRCReconfiguration:
1> if the RRCReconfiguration includes the fullConfig;
   2> perform the radio configuration procedure as specified in 5.3.5.11:
1> if the RRCReconfiguration includes the masterCellGroup:
   2> perform the cell group configuration for the received masterCellGroup according to 5.3.5.5;
1> if the RRCReconfiguration includes the masterKeyUpdate;
   2> perform security key update procedure as specified in 5.3.5.7;
1> if the RRCReconfiguration includes the secondaryCellGroup:
   2> perform the cell group configuration for the SCG according to 5.3.5.5:
1> if the RRCReconfiguration message contains the radioBearerConfig;
   2> perform the radio bearer configuration according to 5.3.5.6;
1> if the RRCReconfiguration message includes the measConfig;
   2> perform the measurement configuration procedure as specified in 5.5.2;
1> if the RRCReconfiguration message includes the dedicatedSIB1-Delivery;
   2> perform the action upon reception of SIB1 as specified in 5.2.2.4.2;
1> if the RRCReconfiguration message includes the dedicatedSystemInformationDelivery;
   2> perform the action upon reception of System Information as specified in 5.2.2.4;
1> set the content of RRCReconfigurationComplete message as follows:
   2> if the RRCReconfiguration includes the masterCellGroup containing the reportUplinkTxDirectCurrent, or;
   2> if the RRCReconfiguration includes the secondaryCellGroup containing the reportUplinkTxDirectCurrent;
      3> include the uplinkTxDirectCurrentList;
1> if the UE is configured with E-UTRA nr-SecondaryCellGroupConfig (MCG is E-UTRA):
   2> if RRCReconfiguration was received via SRB1:
      3> submit the RRCReconfigurationComplete via the EUTRA MCG embedded in E-UTRA RRC message RRCConnectionReconfigurationComplete as specified in TS 36.331 [10]:
      3> if reconfiguration WithSync was included in spCellConfig of an SCG:
         4> initiate the random access procedure on the SpCell, as specified in TS 38.321 [3];
      3> else:
         4> the procedure ends;
NOTE: The order the UE sends the RRCConnectionReconfigurationComplete message and performs the Random Access procedure towards the SCG is left to UE implementation.
   2> else (RRCReconfiguration was received via SRB3):
      3> submit the RRCReconfigurationComplete message via SRB3 to lower layers for transmission using the new configuration;
NOTE: For EN-DC, in the case of SRB1, the random access is triggered by RRC layer itself as there is not necessarily other UL transmission. In the case of SRB3, the random access is triggered by the MAC layer due to arrival of RRCReconfigurationComplete.
1> else:
   2> submit the RRCReconfigurationComplete message via SRB1 to lower layers for transmission using the new configuration;
1> if reconfiguration WithSync was included in spCellConfig of an MCG or SCG, and when MA C of an NR cell group successfully completes a random access procedure triggered above;
   2> stop timer T304 for that cell group;
   2> apply the parts of the CQI reporting configuration, the scheduling request configuration and the sounding RS configuration that do not require the UE to know the SEN of the respective target SpCell, if any;
   2> apply the parts of the measurement and the radio resource configuration that require the UE to know the SEN of the respective target SpCell (for example, measurement gaps, periodic CQI reporting, scheduling request configuration, sounding RS configuration), if any, upon acquiring the SEN of that target SpCell;
   2> if the reconfiguration WithSync was included in spCellConfig of an MCG;
      3> if the active downlink BWP, which is indicated by the firstActiveDownlinkBWP-Id for the target SpCell of the MCG, has a common search space configured:
         4> acquire the SIB1 of the target SpCell of the MCG, as specified in 5.2.2.3.1;
   2> the procedure ends.
NOTE: The UE is only required to acquire broadcasted SIB1 if the UE can acquire it without disrupting unicast data reception, i.e. the broadcast and unicast beams are quasi co-located.

5.5.x Conditional mobility triggering
The UE shall:
1> if the measId provided in condReconfigurationList exists in the measIdList within the VarMeasConfig:
2> perform the evaluation of the criteria as specified in 5.5.4 for each associated measId;
2> if the reportType is set to eventTriggered and if the entry condition applicable for this event, i.e. the event corresponding with the eventId of the corresponding reportConfig within VarMeasConfig, is fulfilled for the cell provided in the reconfiguration WithSyncfor all measurements after layer 3 filtering taken during timeToTrigger defined for this event within the VarMeasConfig:
3> perform actions as specified in 5.3.5.3;

The RRCResume message is used to resume the suspended RRC connection
Signalling radio bearer: SRB1
RLC-SAP: AM
Logical channel: DCCH
Direction: Network to UE in another embodiment related to this resume method, conditional handover may be configured during a reestablishment procedure, either by including conditional handover configuration(s) in an RRC reestablishment like message (for example, RRCReestablishment in NR or RRCConnectionReestablishment in LTE) or in an RRCReconfiguration message (the first after RRC reestablishment like message) that may be multiplexed with the RRC reestablishment like message. The actions upon reception are similar to the ones described for the resume case.

In another embodiment related to this resume method, conditional handover may be configured during a setup procedure, either by including conditional handover configurations) in an RRC Setup like message (for example, RRCSetup in NR or RRCConnectionSetup in LTE) or in an RRCReconfiguration message (the first after RRC reestablishment like message) that may be multiplexed with the RRC reestablishment like message. The actions upon reception are similar to the ones described for the resume case.

Figure 6:
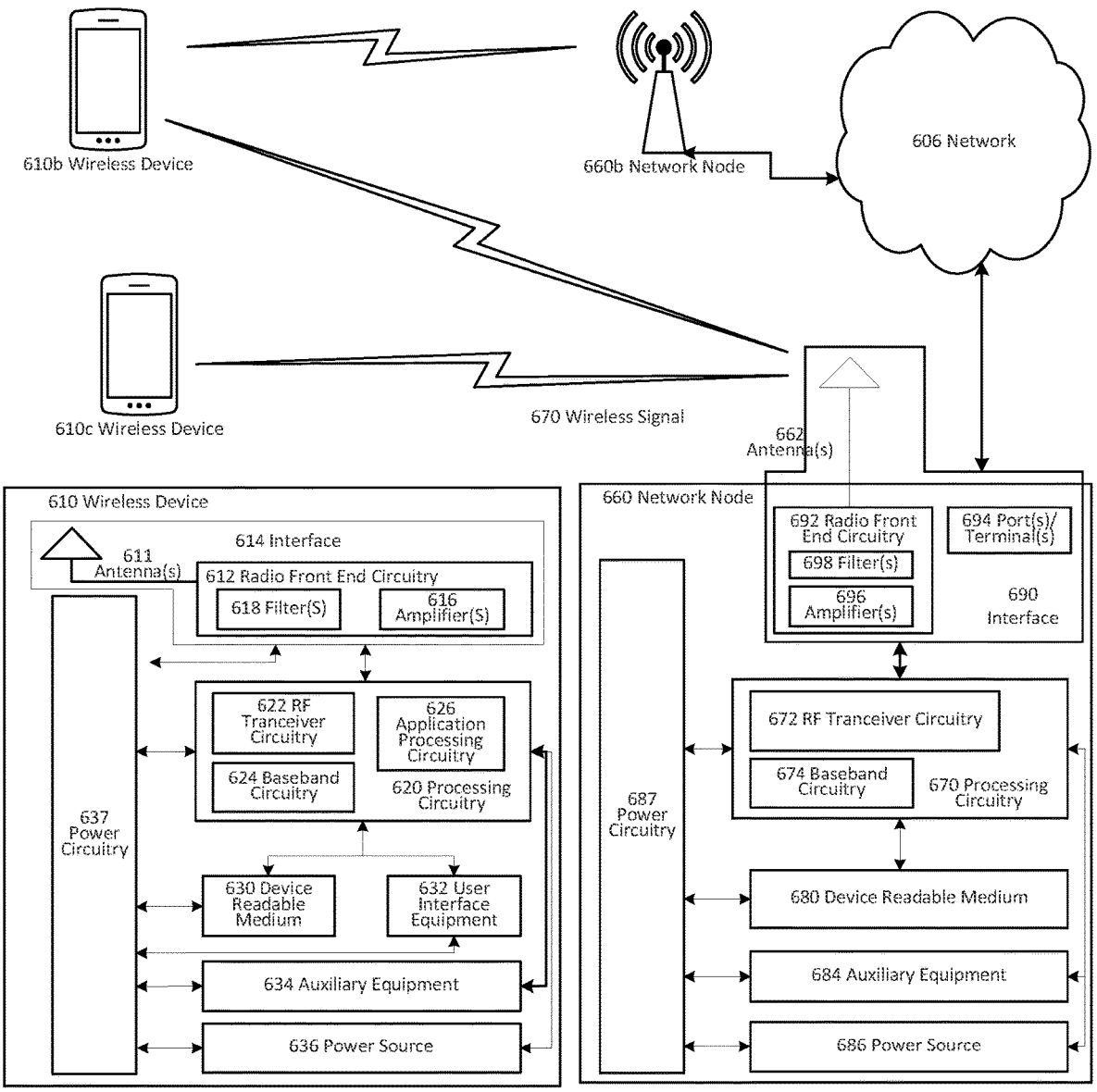
FIG. 6 is a block diagram illustrating a wireless network, according to some examples.

Although the subject matter described herein may be implemented in any appropriate type of system using any suitable components, the embodiments disclosed herein are described in relation to a wireless network, such as the example wireless network illustrated in FIG. 6. For simplic- RRCResume Message

```
-- ASN1START
-- TAG-RRCRESUME-START
RRCResume ::=          SEQUENCE {
    rrc-TransactionIdentifier         RRC-TransactionIdentifier,
    criticalExtensions     CHOICE {
        rrcResume          RRCResume-IEs,
        criticalExtensionsFuture                       SEQUENCE { }
    }
}
RRCResume-IEs ::=      SEQUENCE {
    radioBearerConfig             RadioBearerConfig                         OPTIONAL, -- Need M
    masterCellGroup        OCTET STRING (CONTAINING CellGroupConfig)        OPTIONAL, -- Need M
    measConfig        MeasConfig                                            OPTIONAL, -- Need M
    fullConfig        ENUMERATED {true}                                     OPTIONAL, -- Need N
    lateNonCriticalExtension              OCTET STRING                      OPTIONAL,
    nonCriticalExtension           RRCResume-v16-IEs                        OPTIONAL
RRCResume-v16-IEs::=   SEQUENCE {
    condReconfigurationList            SEQUENCE (SIZE (1..maxCondReconfigurations)) OF CondReconfiguration OPTIONAL, -- Need N
...
}
CondReconfiguration::=                                  SEQUENCE {
    rrcReconfigurationToApply                           OCTET STRING (CONTAINING RRCReconfiguration),
    measIdCond                                          MeasId,
...
}
}
-- TAG-RRCRESUME-STOP
-- ASN1STOP
```

| RRCResume-IEs field descriptions |
|---|
| masterCellGroup<br>Configuration of the master cell group (NR Standalone):<br>radioBearerConfig<br>Configuration of Radio Bearers (DRBs, SRBs) including SDAP/PDCP.<br>measIdCond<br>Indicates the measurement identifier in VarMeasConfig associated to the reportConfig and measObject configuring the trigger condition. When the condition in reportConfig is triggered, the UE triggers conditional mobility procedure associated. | ity, the wireless network of FIG. 6 only depicts network 606, network nodes 660 and 660b, and WDs 610, 610b, and 610c. In practice, a wireless network may further include any additional elements suitable to support communication between wireless devices or between a wireless device and another communication device, such as a landline telephone, a service provider, or any other network node or end device. Of the illustrated components, network node 660 and wireless device (WD) 610 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM). Universal Mobile Telecommunications System (UMTS), Long Term Evolution (LTE), and/or other suitable 2G, 3G, 4G, or 5G standards, wireless local area network (WLAN) standards, such as the IEEE 802.11 standards, and/or any other appropriate wireless communication standard, such as the Worldwide Interoperability for Microwave Access (WiMax), Bluetooth, Z-Wave and/or ZigBee standards.

Network 606 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 660 and WD 610 comprise various components described in more detail below. These components work together to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (for example, administration) in the wireless network Examples of network nodes include, but are not limited to, access points (APs) (for example, radio access points), base stations (BSs) (for example, radio base stations. Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (for example, MSCs, MMEs), O&M nodes, OSS nodes, SON nodes, positioning nodes (for example, E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 6, network node 660 includes processing circuitry 670, device readable medium 680, interface 690, auxiliary equipment 684, power source 686, power circuitry 687, and antenna 662. Although network node 660 illustrated in the example wireless network of FIG. 6 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 660 are depicted as single boxes located within a larger box, or nested within multiple boxes, in practice, a network node may comprise multiple different physical components that make up a single illustrated component (for example, device readable medium 680 may comprise multiple separate hard drives as well as multiple RAM modules).

Similarly, network node 660 may be composed of multiple physically separate components (for example, a NodeB component and a RNC component, or a BTS component and a BSC component, etc.), which may each have their own respective components. In certain scenarios in which network node 660 comprises multiple separate components (for example, BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 660 may be configured to support multiple radio access technologies (RATs). In such embodiments, some components may be duplicated (for example, separate device readable medium 680 for the different RATs) and some components may be reused (for example, the same antenna 662 may be shared by the RATs). Network node 660 may also include multiple sets of the various illustrated components for different wireless technologies integrated into network node 660, such as, for example, GSM, WCDMA, LTE, NR, WiFi, or Bluetooth wireless technologies. These wireless technologies may be integrated into the same or different chip or set of chips and other components within network node 660.

Processing circuitry 670 is configured to perform any determining, calculating, or similar operations (for example, certain obtaining operations) described herein as being provided by a network node. These operations performed by processing circuitry 670 may include processing information obtained by processing circuitry 670 by, for example, converting the obtained information into other information, comparing the obtained information or converted information to information stored in the network node, and/or performing one or more operations based on the obtained information or converted information, and as a result of said processing making a determination.

Processing circuitry 670 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 660 components, such as device readable medium 680, network node 660 functionality. For example, processing circuitry 670 may execute instructions stored in device readable medium 680 or in memory within processing circuitry 670. Such functionality may include providing any of the various wireless features, functions, or benefits discussed herein. In some embodiments, processing circuitry 670 may include a system on a chip (SOC).

In some embodiments, processing circuitry 670 may include one or more of radio frequency (RF) transceiver circuitry 672 and baseband processing circuitry 674. In some embodiments, radio frequency (RF) transceiver circuitry 672 and baseband processing circuitry 674 may be on separate chips (or sets of chips), boards, or units, such as radio units and digital units. In alternative embodiments, part or all of RF transceiver circuitry 672 and baseband processing circuitry 674 may be on the same chip or set of chips, boards, or units In certain embodiments, some or all of the functionality described herein as being provided by a network node, base station, eNB or other such network device may be performed by processing circuitry 670 executing instructions stored on device readable medium 680 or memory within processing circuitry 670. In alternative embodiments, some or all of the functionality may be provided by processing circuitry 670 without executing instructions stored on a separate or discrete device readable medium, such as in a hard-wired manner. In any of those embodiments, whether executing instructions stored on a device readable storage medium or not, processing circuitry 670 can be configured to perform the described functionality. The benefits provided by such functionality are not limited to processing circuitry 670 alone or to other components of network node 660, but are enjoyed by network node 660 as a whole, and/or by end users and the wireless network generally.

Device readable medium 680 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 670. Device readable medium 680 may store any suitable instructions, data or information, including a computer program, software, an application including one or more of logic, rules, code, tables, etc. and/or other instructions capable of being executed by processing circuitry 670 and, utilized by network node 660. Device readable medium 680 may be used to store any calculations made by processing circuitry 670 and/or any data received via interface 690. In some embodiments, processing circuitry 670 and device readable medium 680 may be considered to be integrated.

Interface 690 is used in the wired or wireless communication of signalling and/or data between network node 660, network 606, and/or WDs 610. As illustrated, interface 690 comprises port(s)/terminal(s) 694 to send and receive data, for example to and from network 606 over a wired connection. Interface 690 also includes radio front end circuitry 692 that may be coupled to, or in certain embodiments a part of, antenna 662. Radio front end circuitry 692 comprises filters 698 and amplifiers 696. Radio front end circuitry 692 may be connected to antenna 662 and processing circuitry 670. Radio front end circuitry may be configured to condition signals communicated between antenna 662 and processing circuitry 670. Radio front end circuitry 692 may receive digital data that is to be sent out to other network nodes or WDs via a wireless connection. Radio front end circuitry 692 may convert the digital data into a radio signal having the appropriate channel and bandwidth parameters using a combination of filters 698 and/or amplifiers 696. The radio signal may then be transmitted via antenna 662. Similarly, when receiving data, antenna 662 may collect radio signals which are then converted into digital data by radio front end circuitry 692. The digital data may be passed to processing circuitry 670. In other embodiments, the interface may comprise different components and/or different combinations of components.

In certain alternative embodiments, network node 660 may not include separate radio front end circuitry 692, instead, processing circuitry 670 may comprise radio front aid circuitry and may be connected to antenna 662 without separate radio front end circuitry 692. Similarly, in some embodiments, all or some of RF transceiver circuitry 672 may be considered a part of interface 690. In still other embodiments, interface 690 may include one or more ports or terminals 694, radio front end circuitry 692, and RF transceiver circuitry 672, as part of a radio unit (not shown), and interface 690 may communicate with baseband processing circuitry 674, which is part of a digital unit (not shown).

Antenna 662 may include one or more antennas, or antenna arrays, configured to send and/or receive wireless signals. Antenna 662 may be coupled to radio front end circuitry 692 and may be any type of antenna capable of transmitting and receiving data and/or signals wirelessly. In some embodiments, antenna 662 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 662 may be separate from network node 660 and may be connectable to network node 660 through an interface or port.

Antenna 662, interface 690, and/or processing circuitry 670 may be configured to perform any receiving operations and/or certain obtaining operations described herein as being performed by a network node. Any information, data and/or signals may be received from a wireless device, another network node and/or any other network equipment. Similarly, antenna 662, interface 690, and/or processing circuitry 670 may be configured to perform any transmitting operations described herein as being performed by a network node Any information, data and/or signals may be transmitted to a wireless device, another network node and/or any other network equipment.

Power circuitry 687 may comprise, or be coupled to, power management circuitry and is configured to supply the components of network node 660 with power for performing the functionality described herein. Power circuitry 687 may receive power from power source 686. Power source 686 and/or power circuitry 687 may be configured to provide power to the various components of network node 660 in a form suitable for the respective components (for example, at a voltage and current level needed for each respective component). Power source 686 may either be included in, or external to, power circuitry 687 and/or network node 660. For example, network node 660 may be connectable to an external power source (for example, an electricity outlet) via an input circuitry or interface such as an electrical cable, whereby the external power source supplies power to power circuitry 687. As a further example, power source 686 may comprise a source of power in the form of a battery or battery pack which is connected to, or integrated in, power circuitry 687. The battery may provide backup power should the external power source fail. Other types of power sources, such as photovoltaic devices, may also be used.

Alternative embodiments of network node 660 may include additional components beyond those shown in FIG. 6 that may be responsible for providing certain aspects of the network node's functionality, including any of the functionality described herein and/or any functionality necessary to support the subject matter described herein. For example, network node 660 may include user interface equipment to allow input of information into network node 660 and to allow output of information from network node 660. This may allow a user to perform diagnostic, maintenance, repair, and other administrative functions for network node 660.

As used herein, wireless device (WD) refers to a device capable, configured, arranged and/or operable to communicate wirelessly with network nodes and/or other w ireless devices Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard Particular examples of such machines or devices are sensors, metering devices such as power meters, industrial machinery, or home or personal appliances (for example, refrigerators, televisions, etc.) personal wearables (for example, watches, fitness trackers, etc.) In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 610 includes antenna 611, interface 614, processing circuitry 620, device readable medium 630, user interface equipment 632, auxiliary equipment 634, power source 636 and power circuitry 637. WD 610 may include multiple sets of one or more of the illustrated components for different wireless technologies supported by WD 610, such as, for example, GSM, WCDMA, LTE, NR, WiFi, WiMAX, or Bluetooth wireless technologies, just to mention a few. These wireless technologies may be integrated into the same or different chips or set of chips as other components within WD 610.

Antenna 611 may include one or more antennas or antenna arrays, configured to send and/or receive wireless signals, and is connected to interface 614. In certain alternative embodiments, antenna 611 may be separate from WD 610 and be connectable to WD 610 through an interface or port. Antenna 611, interface 614, and/or processing circuitry 620 may be configured to perform any receiving or transmitting operations described herein as being performed by a WD. Any information, data and/or signals may be received from a network node and/or another WD. In some embodiments, radio front end circuitry and/or antenna 611 may be considered an interface.

As illustrated, interface 614 comprises radio front end circuitry 612 and antenna 611. Radio front end circuitry 612 comprise one or more filters 618 and amplifiers 616. Radio front end circuitry 612 is connected to antenna 611 and processing circuitry 620, and is configured to condition signals communicated between antenna 611 and processing circuitry 620. Radio front end circuitry 612 may be coupled to or a part of antenna 611. In some embodiments, WD 610 may not include separate radio front end circuitry 612, rather, processing circuitry 620 may comprise radio front end circuitry and may be connected to antenna 611. Similarly, in some embodiments, some or all of RF transceiver circuitry 622 may be considered apart of interface 614. Radio front end circuitry 612 may receive digital data that is to be sent out to other network nodes or WDs via a wireless connection. Radio front end circuitry 612 may convert the digital data into a radio signal having the appropriate channel and bandwidth parameters using a combination of filters 618 and/or amplifiers 616. The radio signal may then be transmitted via antenna 611. Similarly, when receiving data, antenna 611 may collect radio signals which are then converted into digital data by radio front end circuitry 612. The digital data may be passed to processing circuitry 620. In other embodiments, the interface may comprise different components and/or different combinations of components.

Processing circuitry 620 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 610 components, such as device readable medium 630, WD 610 functionality. Such functionality may include providing any of the various wireless features or benefits discussed herein. For example, processing circuitry 620 may execute instructions stored in device readable medium 630 or in memory within processing circuitry 620 to provide the functionality disclosed herein.

As illustrated, processing circuitry 620 includes one or more of RF transceiver circuitry 622, baseband processing circuitry 624, and application processing circuitry 626. In other embodiments, the processing circuitry may comprise different components and/or different combinations of components. In certain embodiments processing circuitry 620 of WD 610 may comprise a SOC. In some embodiments, RF transceiver circuitry 622, baseband processing circuitry 624, and application processing circuitry 626 may be on separate chips or sets of chips. In alternative embodiments, part or all of baseband processing circuitry 624 and application processing circuitry 626 may be combined into one chip or set of chips, and RF transceiver circuitry 622 may be on a separate chip or set of chips. In still alternative embodiments, part or all of RF transceiver circuitry 622 and baseband processing circuitry 624 may be on the same chip or set of chips, and application processing circuitry 626 may be on a separate chip or set of chips. In yet other alternative embodiments, part or all of RF transceiver circuitry 622, baseband processing circuitry 624, and application processing circuitry 626 may be combined in the same chip or set of chips. In some embodiments, RF transceiver circuitry 622 may be a part of interface 614. RF transceiver circuitry 622 may condition RF signals for processing circuitry 620.

In certain embodiments, some or all of the functionality described herein as being performed by a WD may be provided by processing circuitry 620 executing instructions stored on device readable medium 630, which in certain embodiments may be a computer-readable storage medium. In alternative embodiments, some or all of the functionality may be provided by processing circuitry 620 without executing instructions stored on a separate or discrete device readable storage medium, such as in a hard-wired manner. In any of those particular embodiments, whether executing instructions stored on a device readable storage medium or not, processing circuitry 620 can be configured to perform the described functionality. The benefits provided by such functionality are not limited to processing circuitry 620 alone or to other components of WD 610, but are enjoyed by WD 610 as a whole, and/or by end users and the wireless network generally.

Processing circuitry 620 may be configured to perform any determining, calculating, or similar operations (for example, certain obtaining operations) described herein as being performed by a WD. These operations, as performed by processing circuitry 620, may include processing information obtained by processing circuitry 620 by, for example, converting the obtained information into other information, comparing the obtained information or converted information to information stored by WD 610, and/or performing one or more operations based on the obtained information or converted information, and as a result of said processing making a determination.

Device readable medium 630 may be operable to store a computer program, software, an application including one or more of logic, rules, code, tables, etc. and/or other instructions capable of being executed by processing circuitry 620. Device readable medium 630 may include computer memory (for example. Random Access Memory (RAM) or Read Only Memory (ROM)), mass storage media (for example, a hard disk), removable storage media (for example, a Compact Disk (CD) or a Digital Video Disk (DVD)), and/or any other volatile or non-volatile, non-transitory device readable and/or computer executable memory devices that store information, data, and/or instructions that may be used by processing circuitry 620. In some embodiments, processing circuitry 620 and device readable medium 630 may be considered to be integrated.

User interface equipment 632 may provide components that allow for a human user to interact with WD 610. Such interaction may be of many forms, such as visual, audial, tactile, etc. User interface equipment 632 may be operable to produce output to the user and to allow the user to provide input to WD 610. The type of interaction may vary depending on the type of user interface equipment 632 installed in WD 610. For example, if WD 610 is a smart phone, the interaction may be via a touch screen; if WD 610 is a smart meter, the interaction may be through a screen that provides usage (for example, the number of gallons used) or a speaker that provides an audible alert (for example, if smoke is detected). User interface equipment 632 may include input interfaces, devices and circuits, and output interfaces, devices and circuits User interface equipment 632 is configured to allow input of information into WD 610, and is connected to processing circuitry 620 to allow processing circuitry 620 to process the input information. User interface equipment 632 may include, for example, a microphone, a proximity or other sensor, keys/buttons, a touch display, one or more cameras, a USB port, or other input circuitry. User interface equipment 632 is also configured to allow output of information from WD 610, and to allow processing circuitry 620 to output information from WD 610. User interface equipment 632 may include, for example, a speaker, a display, vibrating circuitry, a USB port, a headphone interface, or other output circuitry. Using one or more input and output interfaces, devices, and circuits, of user interface equipment 632, WD 610 may communicate with end users and/or the wireless network, and allow them to benefit from the functionality described herein.

Auxiliary equipment 634 is operable to provide more specific functionality which may not be generally performed by WDs. This may comprise specialized sensors for doing measurements for various purposes, interfaces for additional types of communication such as wired communications etc. The inclusion and type of components of auxiliary equipment 634 may vary depending on the embodiment and/or scenario.

Power source 636 may, in some embodiments, be in the form of a battery or battery pack. Other ty pes of power sources, such as an external power source (for example, an electricity outlet), photovoltaic devices or power cells, may also be used. WD 610 may further comprise power circuitry 637 for delivering power from power source 636 to the various parts of WD 610 which need power from power source 636 to carry out any functionality described or indicated herein. Power circuitry 637 may in certain embodiments comprise power management circuitry. Power circuitry 637 may additionally or alternatively be operable to receive power from an external power source; in which case WD 610 may be connectable to the external power source (such as an electricity outlet) via input circuitry or an interface such as an electrical power cable. Power circuitry 637 may also in certain embodiments be operable to deliver power from an external power source to power source 636. This may be, for example, for the charging of power source 636. Power circuitry 637 may perform any formatting, converting, or other modification to the power from power source 636 to make the power suitable for the respective components of WD 610 to which power is supplied.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Group A Embodiments

1. A method performed by a wireless device for handling conditional handover configurations, the method comprising:
   while in a connected state, receiving and storing one or more conditional handover configurations, wherein each of the one or more handover configurations are associated with a target cell candidate;
   transitioning from the connected state to a sleeping state, the transitioning including discarding the one or more conditional handover configurations;
   releasing resources associated with the one or more conditional handover configurations; and
   performing one or more clean up actions relating to conditional handover.
2. The method of embodiment 1, wherein the connected state comprises RRC_CONNECTED.
3. The method of any of embodiments 1 or 2, wherein the sleeping state comprises RRC_INACTIVE or RRC_IDLE
4. The method of any of embodiments 1-3, wherein the releasing of the resources is performed upon a reception of an Radio Resource Control, RRC, release message.
5. The method of any of embodiments 1-4, wherein the one or more clean up actions comprise one or more of:
   discarding state variables;
   discarding measurements that were monitored for conditional handover conditions;
   stopping monitoring corresponding to conditional handover conditions; and
   stopping timers associated with conditional handover procedures.
6. The method of any of embodiments 1-5, further comprising setting up conditional handover for transitioning from the sleeping state to the connected state, the transitioning including:
   transmitting an RRC resume request message;
   receiving an RRC resume message including at least one conditional handover configuration; and
   performing one or more actions responsive to the received conditional handover configuration.

Group B Embodiments

7. A method performed by a base station for transitioning a user equipment, UE, from a connected state to a sleeping state, the method comprising:
   transmitting, to the UE, a message to suspend to inactive or release to idle, wherein the UE has one or more stored conditional handover configurations that are associated with a target cell candidate;
   transitioning from the connected state to the sleeping state, the transitioning including discarding the one or more conditional handover configurations.
8. The method of embodiment 7, wherein the connected state comprises RRC_CONNECTED.
9. The method of any of embodiments 7 or 8, wherein the sleeping state comprises RRC_INACTIVE or RRC_IDLE
10. The method of any of embodiments 7-9, further comprising: informing at least one target node candidate regarding the suspension or release of the UE.
11. The method of any of embodiments 7-10, further comprising setting up conditional handover relating to transitioning the UE from the sleeping state to the connected state, the transitioning including:
    receiving an RRC resume request message;
    determining, based on an Access Stratum (AS) context corresponding to the UE, that conditional handover is supported by the UE;
    configuring a conditional handover configuration for the UE, the conditional handover configuration corresponding to at least one target cell; and
    transmitting, to the UE, an RRC resume message including the configured conditional handover configuration.
12. The method of embodiment 11, further comprising:
    transmitting a conditional handover preparation message to one or more target node candidates corresponding to the target cell; and
    receiving, from at least one of the one or more target node candidates, an RRC message including conditions for conditional handover.

Group C Embodiments

13. A wireless device for handling conditional handover configurations, the wireless device comprising:
    processing circuitry configured to perform any of the steps of any of the Group A embodiments; and
    power supply circuitry configured to supply power to the wireless device.
14. A base station for transitioning a user equipment, UE, from a connected state to a sleeping state, the base station comprising:
    processing circuitry configured to perform any of the steps of any of the Group B embodiments,
    power supply circuitry configured to supply power to the wireless device.

15. A user equipment (UE) for handling conditional handover configurations, the UE comprising:
- an antenna configured to send and receive wireless signals;
- radio front-end circuitry connected to the antenna and to processing circuitry, and configured to condition signals communicated between the antenna and the processing circuitry;
- the processing circuitry being configured to perform any of the steps of any of the Group A embodiments;
- an input interface connected to the processing circuitry and configured to allow input of information into the UE to be processed by the processing circuitry;
- an output interface connected to the processing circuitry and configured to output information from the UE that has been processed by the processing circuitry; and
- a battery connected to the processing circuitry and configured to supply power to the UE.

16. A communication system including a host computer comprising:
- processing circuitry configured to provide user data; and
- a communication interface configured to forward the user data to a cellular network for transmission to a user equipment (UE), wherein the cellular network comprises a base station having a radio interface and processing circuitry, the base station s processing circuitry configured to perform any of the steps of any of the Group B embodiments.

17. The communication system of the previous embodiment further including the base station.

18. The communication system of the previous 2 embodiments, further including the UE, wherein the UE is configured to communicate with the base station.

19. The communication system of the previous 3 embodiments, wherein:
- the processing circuitry of the host computer is configured to execute a host application, thereby providing the user data; and
- the UE comprises processing circuitry configured to execute a client application associated with the host application.

20. A method implemented in a communication system including a host computer, a base station and a user equipment (UE), the method comprising:
- at the host computer, providing user data; and
- at the host computer, initiating a transmission carrying the user data to the UE via a cellular network comprising the base station, wherein the base station performs any of the steps of any of the Group B embodiments.

21. The method of the previous embodiment, further comprising, at the base station, transmitting the user data.

22. The method of the previous 2 embodiments, wherein the user data is provided at the host computer by executing a host application, the method further comprising, at the UE, executing a client application associated with the host application.

23. A user equipment (UE) configured to communicate with a base station, the UE comprising a radio interface and processing circuitry configured to performs the of the previous 3 embodiments.

24. A communication system including a host computer comprising:
- processing circuitry configured to provide user data; and
- a communication interface configured to forward user data to a cellular network for transmission to a user equipment (UE), wherein the UE comprises a radio interface and processing circuitry, the UE's components configured to perform any of the steps of any of the Group A embodiments.

25. The communication system of the previous embodiment, wherein the cellular network further includes a base station configured to communicate with the UE.

26. The communication system of the previous 2 embodiments, wherein:
- the processing circuitry of the host computer is configured to execute a host application, thereby providing the user data; and
- the UE's processing circuitry is configured to execute a client application associated with the host application.

27. A method implemented in a communication system including a host computer, a base station and a user equipment (UE), the method comprising:
- at the host computer, providing user data; and
- at the host computer, initiating a transmission carrying the user data to the UE via a cellular network comprising the base station, wherein the UE performs any of the steps of any of the Group A embodiments.

28. The method of the previous embodiment, further comprising at the UE, receiving the user data from the base station.

29. A communication system including a host computer comprising:
- communication interface configured to receive user data originating from a transmission from a user equipment (UE) to a base station, wherein the UE comprises a radio interface and processing circuitry, the UE's processing circuitry configured to perform any of the steps of any of the Group A embodiments.

30. The communication system of the previous embodiment, further including the UE.

31. The communication system of the previous 2 embodiments, further including the base station, wherein the base station comprises a radio interface configured to communicate with the UE and a communication interface configured to forward to the host computer the user data carried by a transmission from the UE to the base station.

32. The communication system of the previous 3 embodiments, wherein:
- the processing circuitry of the host computer is configured to execute a host application; and
- the UE's processing circuitry is configured to execute a client application associated with the host application, thereby providing the user data.

33. The communication system of the previous 4 embodiments, wherein:
- the processing circuitry of the host computer is configured to execute a host application, thereby providing request data; and
- the UE's processing circuitry is configured to execute a client application associated with the host application, thereby providing the user data in response to the request data.

34. A method implemented in a communication system including a host computer, a base station and a user equipment (UE), the method comprising:
- at the host computer, receiving user data transmitted to the base station from the UE, wherein the UE performs any of the steps of any of the Group A embodiments.

35. The method of the previous embodiment, further comprising, at the UE, providing the user data to the base station.

36. The method of the previous 2 embodiments, further comprising:
   at the UE, executing a client application, thereby providing the user data to be transmitted, and
   at the host computer, executing a host application associated with the client application.

37. The method of the previous 3 embodiments, further comprising:
   at the UE, executing a client application; and
   at the UE, receiving input data to the client application, the input data being provided at the host computer by executing a host application associated with the client application, wherein the user data to be transmitted is provided by the client application in response to the input data.

38. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

39. The communication system of the previous embodiment further including the base station.

40. The communication system of the previous 2 embodiments, further including the UE, wherein the UE is configured to communicate with the base station.

41. The communication system of the previous 3 embodiments, wherein:
   the processing circuitry of the host computer is configured to execute a host application;
   the UE is configured to execute a client application associated with the host application, thereby providing the user data to be received by the host computer.

42. A method implemented in a communication system including a host computer, a base station and a user equipment (UE), the method comprising:
   at the host computer, receiving, from the base station, user data originating from a transmission which the base station has received from the UE, wherein the UE performs any of the steps of any of the Group A embodiments.

43. The method of the previous embodiment, further comprising at the base station, receiving the user data from the UE.

44 The method of the previous 2 embodiments, further comprising at the base station, initiating a transmission of the received user data to the host computer.

The invention claimed is:

1. A method performed by a wireless device for handling conditional handover configurations, the method comprising:
   while in a connected state:
      receiving and storing one or more conditional handover configurations, wherein each of the one or more conditional handover configurations is associated with a target cell candidate;
      transitioning from the connected state to a sleeping state, the transitioning including discarding the one or more conditional handover configurations;
      releasing resources associated with the one or more conditional handover configurations;
      performing one or more clean up actions relating to conditional handover; and
      transitioning from the sleeping state to the connected state comprising:
         transmitting a Radio Resource Control (RRC) resume request message;
         receiving an RRC resume message including at least one conditional handover configuration; and
         performing one or more actions responsive to the at least one conditional handover configuration.

2. The method of claim 1, wherein the connected state comprises RRC_CONNECTED.

3. The method of claim 1, wherein the sleeping state comprises RRC_INACTIVE or RRC_IDLE.

4. The method of claim 1, wherein the releasing of the resources is performed upon reception of an Radio Resource Control (RRC) release message.

5. The method of claim 1, wherein the one or more clean up actions comprise one or more of:
   discarding state variables;
   discarding measurements that were monitored for conditional handover conditions;
   stopping monitoring corresponding to conditional handover conditions; or
   stopping timers associated with conditional handover procedures.

6. A user equipment (UE) comprising:
   a non-transitory memory; and
   processing circuitry coupled to the non-transitory memory and configured to read instructions from the non-transitory memory to cause the user equipment to perform operations comprising:
      while in a connected state:
         receiving and storing one or more conditional handover configurations, wherein each of the one or more conditional handover configurations is associated with a target cell candidate;
         transitioning from the connected state to a sleeping state, the transitioning including discarding the one or more conditional handover configurations;
         releasing resources associated with the one or more conditional handover configurations;
         performing one or more clean up actions relating to conditional handover; and
         transitioning from the sleeping state to the connected state comprising:
            transmitting a Radio Resource Control (RRC) resume request message;
            receiving an RRC resume message including at least one conditional handover configuration; and
            performing one or more actions responsive to the received at least one conditional handover configuration.

7. The user equipment of claim 6, wherein the connected state comprises RRC_CONNECTED.

8. The user equipment of claim 6, wherein the sleeping state comprises RRC_INACTIVE or RRC_IDLE.

9. The user equipment of claim 6, wherein the releasing of the resources is performed upon reception of an Radio Resource Control (RRC) release message.

10. The user equipment of claim 6, wherein the one or more clean up actions comprise one or more of:
   discarding state variables;
   discarding measurements that were monitored for conditional handover conditions;
   stopping monitoring corresponding to conditional handover conditions; or
   stopping timers associated with conditional handover procedures.

11. A non-transitory computer-readable storage medium having stored thereon instructions executable to cause a wireless device to perform operations comprising:
- while in a connected state:
  - receiving and storing one or more conditional handover configurations, wherein each of the one or more conditional handover configurations is associated with a target cell candidate;
  - transitioning from the connected state to a sleeping state, the transitioning including discarding the one or more conditional handover configurations;
  - releasing resources associated with the one or more conditional handover configurations;
  - performing one or more clean up actions relating to conditional handover; and
  - transitioning from the sleeping state to the connected state comprising:
    - transmitting a Radio Resource Control (RRC) resume request message;
    - receiving an RRC resume message including at least one conditional handover configuration; and
    - performing one or more actions responsive to the at least one conditional handover configuration.

12. The non-transitory computer-readable storage medium of claim 11, wherein the connected state comprises RRC_CONNECTED.

13. The non-transitory computer-readable storage medium of claim 11, wherein the sleeping state comprises RRC_INACTIVE or RRC_IDLE.

14. The non-transitory computer-readable storage medium of claim 11, wherein the releasing of the resources is performed upon reception of an Radio Resource Control (RRC) release message.

15. The non-transitory computer-readable storage medium of claim 11, wherein the one or more clean up actions comprise one or more of:
- discarding state variables;
- discarding measurements that were monitored for conditional handover conditions;
- stopping monitoring corresponding to conditional handover conditions; or
- stopping timers associated with conditional handover procedures.

* * * * *

UNITED STATES PATENT AND TRADEMARK OFFICE
CERTIFICATE OF CORRECTION

PATENT NO. : 11,895,545 B2
APPLICATION NO. : 17/293328
DATED : February 6, 2024
INVENTOR(S) : Da Silva et al.

It is certified that error appears in the above-identified patent and that said Letters Patent is hereby corrected as shown below:

On the Title Page

In Item (57), under "ABSTRACT", in Column 2, Lines 8-9, delete "discarding the" and insert -- discarding --, therefor.

In the Specification

In Column 1, Line 63, delete "RRCResume Request" and insert -- RRCResumeRequest --, therefor.

In Column 2, Line 6, delete "indication)," and insert -- indication); --, therefor.

In Column 2, Line 19, delete "UE s" and insert -- UE's --, therefor.

In Column 2, Line 54, delete "RRC_INACTIVE," and insert -- RRC_INACTIVE; --, therefor.

In Column 3, Line 13, delete "(RRCConnedionReconfiguration" and insert -- (RRCConnectionReconfiguration --, therefor.

In Column 3, Line 15, delete "reconfiguration WithSync" and insert -- reconfigurationWithSync --, therefor.

In Column 3, Lines 42-43, delete "reconfiguration With Sync" and insert -- reconfigurationWithSync --, therefor.

In Columns 3 & 4, in Table, Line 3, delete "HandoverPreparationInfomiation" and insert -- HandoverPreparationInformation --, therefor.

In Columns 5 & 6, in Table-continued, Line 26, delete "mm28, mm33, mm38," and insert -- min28, min33, min38, --, therefor.

Signed and Sealed this
Twenty-eighth Day of May, 2024

*Katherine Kelly Vidal*

Katherine Kelly Vidal
*Director of the United States Patent and Trademark Office*

CERTIFICATE OF CORRECTION (continued)
U.S. Pat. No. 11,895,545 B2

In Columns 5 & 6, in Table-continued, Line 27, delete "hr2mm30, br3," and insert -- hr2min30, hr3, --, therefor.

In Columns 5 & 6, in Table-continued, Line 34, delete "TAG-HANDOVER-PREARATION-INFORMATION-STOP" and insert -- TAG-HANDOVER-PREPARATION-INFORMATION-STOP --, therefor.

In Column 7, Line 3, delete "(unction" and insert -- function --, therefor.

In Column 7, Line 27, delete "IS" and insert -- TS --, therefor.

In Column 8, Line 7, delete "Success fill" and insert -- Successful --, therefor.

In Column 8, Line 56, delete "SME" and insert -- SMF --, therefor.

In Column 8, Line 58, delete "jailed" and insert -- failed --, therefor.

In Column 8, Line 62, delete "[10]" and insert -- [10]. --, therefor.

In Column 9, Line 4, delete "IF," and insert -- IE --, therefor.

In Column 9, Line 12, delete "IF," and insert -- IE --, therefor.

In Column 9, Line 16, delete "IF," and insert -- IE --, therefor.

In Column 9, Line 62, delete "PA TH" and insert -- PATH --, therefor.

In Column 11, Line 44, delete "show s" and insert -- shows --, therefor.

In Column 12, Line 27, delete "herein," and insert -- herein; --, therefor.

In Column 12, Line 52, delete "T320" and insert -- t320 --, therefor.

In Column 12, Line 55, delete "else;" and insert -- else: --, therefor.

In Column 12, Line 59, delete "included;" and insert -- included: --, therefor.

In Column 12, Line 63, delete "suspendConfig;" and insert -- suspendConfig: --, therefor.

In Column 13, Line 3, delete "RRCResumeRequest1;" and insert -- RRCResumeRequest1: --, therefor.

In Column 13, Line 9, delete "message:" and insert -- message; --, therefor.

In Column 13, Line 18, delete "else;" and insert -- else: --, therefor.

CERTIFICATE OF CORRECTION (continued)
U.S. Pat. No. 11,895,545 B2

In Column 13, Line 39, delete "stale" and insert -- state --, therefor.

In Column 13, Lines 44-45, delete "comprising." and insert -- comprising: --, therefor.

In Column 14, Line 15, delete "configurations)" and insert -- configuration(s) --, therefor.

In Column 14, Line 21, delete "RRC_IDLE), and" and insert -- RRC_IDLE); and --, therefor.

In Column 14, Line 24, delete "configurations)," and insert -- configuration(s), --, therefor.

In Column 14, Line 28, delete "handover" and insert -- handover. --, therefor.

In Column 15, Line 24, delete "handovers)" and insert -- handover(s) --, therefor.

In Column 16, Line 48, delete "NR, or" and insert -- NR; or --, therefor.

In Column 17, Line 11, delete "state" and insert -- state. --, therefor.

In Column 17, Line 20, delete "includes." and insert -- includes: --, therefor.

In Column 17, Line 25, delete "configurations:" and insert -- configurations; --, therefor.

In Column 18, Line 3, delete "w ireless" and insert -- wireless --, therefor.

In Column 18, Line 15, delete "configurations)" and insert -- configuration(s) --, therefor.

In Column 18, Line 20, delete "reconfiguration WithSync)" and insert
-- reconfigurationWithSync) --, therefor.

In Column 18, Line 58, delete "earlier:" and insert -- earlier; --, therefor.

In Column 18, Line 64, delete "handovers);" and insert -- handover(s); --, therefor.

In Column 19, Line 7, delete "included;" and insert -- included: --, therefor.

In Column 19, Lines 15-16, delete "cellReselectionPriorities;" and insert
-- cellReselectionPriorities: --, therefor.

In Column 19, Line 22, delete "the value of t320," and insert the same on Line 21 after "according to"
as a continuation paragraph.

In Column 19, Line 30, delete "suspendConfig;" and insert -- suspendConfig: --, therefor.

In Column 19, Line 52, delete "suspendConfig:" and insert -- suspendConfig; --, therefor.

In Column 19, Line 55, delete "alt" and insert -- all --, therefor.

CERTIFICATE OF CORRECTION (continued)
U.S. Pat. No. 11,895,545 B2

In Column 19, Lines 66-67, delete "waitTime;" and insert -- waitTime: --, therefor.

In Column 20, Line 48, delete "UE" and insert -- UE. --, therefor.

In Column 21, Line 2, delete "message:" and insert -- message; --, therefor.

In Column 21, Line 7, delete "cell:" and insert -- cell; --, therefor.

In Column 21, Line 28, delete "configurations)." and insert -- configuration(s). --, therefor.

In Column 21, Line 60, delete "IES" and insert -- IEs --, therefor.

In Column 22, Lines 16-17, delete "RRConditionalReconfiguration" and insert -- RRCConditionalReconfiguration --, therefor.

In Columns 21 & 22, in Table "RRCConditionalReconfiguration Message", Line 4, delete "rrc-Transactionldendfier" and insert -- rrc-TransactionIdentifier --, therefor.

In Column 22, Lines 64-65, delete "threshold:" and insert -- threshold; --, therefor.

In Columns 23 & 24, in Table "ReportConfigNR Information Element", Line 74, delete "PenodicalReportConfig" and insert -- PeriodicalReportConfig --, therefor.

In Columns 25 & 26, in Table-continued, Line 6, delete "reportQuantitvRsIndexes" and insert -- reportQuantityRsIndexes --, therefor.

In Columns 25 & 26, in Table-continued, Line 8, delete "maxNrotRsIndexesToReport" and insert -- maxNrofRsIndexesToReport --, therefor.

In Column 25, Line 35, delete "shall;" and insert -- shall: --, therefor.

In Column 25, Line 37, delete "fullConfig;" and insert -- fullConfig: --, therefor.

In Column 25, Line 40, delete "5.3.5.11:" and insert -- 5.3.5.11; --, therefor.

In Column 25, Line 43, delete "far" and insert -- for --, therefor.

In Column 25, Line 54, delete "FES" and insert -- FFS --, therefor.

In Column 25, Line 56, delete "radioBearerConftg:" and insert -- radioBearerConfig: --, therefor.

In Column 25, Line 60, delete "FES" and insert -- FFS --, therefor.

In Column 25, Line 61, delete "radioBearerConftg." and insert -- radioBearerConfig. --, therefor.

In Column 25, Line 65, delete "RA T;" and insert -- RAT; --, therefor.

In Column 25, Line 67, delete "measConfig;" and insert -- measConfig: --, therefor.

In Column 26, Line 33, delete "FES" and insert -- FFS --, therefor.

In Column 26, Line 33, delete "LIE" and insert -- UE --, therefor.

In Column 26, Line 50, delete "follows;" and insert -- follows: --, therefor.

In Column 26, Line 58, delete "master CellGroup" and insert -- masterCellGroup --, therefor.

In Column 26, Line 64, delete "RRC Reconfiguration" and insert -- RRCReconfiguration --, therefor.

In Column 27, Line 1, delete "fullConfig;" and insert -- fullConfig: --, therefor.

In Column 27, Lines 4-5, delete "masterCellGroup;" and insert -- masterCellGroup: --, therefor.

In Column 27, Lines 12-13, delete "secondaryCellGroup;" and insert -- secondaryCellGroup: --, therefor.

In Column 27, Line 22, delete "measConfig;" and insert -- measConfig: --, therefor.

In Column 27, Line 26, delete "Delivery;" and insert -- Delivery: --, therefor.

In Column 27, Line 35, delete "follows;" and insert -- follows: --, therefor.

In Column 27, Line 45, delete "SRB1;" and insert -- SRB1: --, therefor.

In Column 27, Line 48, delete "RRCConnectionReconftgurationComplete" and insert -- RRCConnectionReconfigurationComplete --, therefor.

In Column 27, Line 50, delete "reconfiguration WithSync" and insert -- reconfigurationWithSync --, therefor.

In Column 27, Line 54, delete "else;" and insert -- else: --, therefor.

In Column 27, Line 56, delete "NOTE;" and insert -- NOTE: --, therefor.

In Column 28, Line 1, delete "SRB3);" and insert -- SRB3): --, therefor.

In Column 28, Line 4, delete "configuration:" and insert -- configuration; --, therefor.

In Column 28, Line 13, delete "configuration:" and insert -- configuration; --, therefor.

In Column 28, Line 16, delete "above:" and insert -- above; --, therefor.

In Column 28, Line 21, delete "if any:" and insert -- if any; --, therefor.

CERTIFICATE OF CORRECTION (continued)
U.S. Pat. No. 11,895,545 B2

In Column 28, Line 27, delete "if any" and insert -- if any, --, therefor.

In Column 28, Line 30, delete "MCG;" and insert -- MCG: --, therefor.

In Column 28, Line 33, delete "configured;" and insert -- configured: --, therefor.

In Column 28, Line 35, delete "5.2.2.3.1:" and insert -- 5.2.2.3.1; --, therefor.

In Column 28, Lines 46-47, delete "reconfiguration WithSyncfor" and insert -- reconfigurationWithSync for --, therefor.

In Column 29, Line 46, delete "Prow" and insert -- Prov. --, therefor.

In Column 29, Line 51, delete "perform" and insert -- perform. --, therefor.

In Column 29, Line 64, delete "RRC Reconfiguration" and insert -- RRCReconfiguration --, therefor.

In Column 30, Line 34, delete "fullConfig;" and insert -- fullConfig: --, therefor.

In Column 30, Line 37, delete "else;" and insert -- else: --, therefor.

In Column 30, Line 40, delete "cellGroupConfigfrom" and insert -- cellGroupConfig from --, therefor.

In Column 30, Line 40, delete "UEAS" and insert -- UE AS --, therefor.

In Column 30, Line 46, delete "masterCellGroup;" and insert -- masterCellGroup: --, therefor.

In Column 30, Line 49, delete "Note;" and insert -- Note: --, therefor.

In Column 30, Line 51, delete "radioBearerConfig;" and insert -- radioBearerConfig: --, therefor.

In Column 30, Line 55, delete "Note;" and insert -- Note: --, therefor.

In Column 30, Line 60, delete "RAT:" and insert -- RAT; --, therefor.

In Column 30, Line 66, delete "Note; FES" and insert -- Note: FFS --, therefor.

In Column 31, Line 3, delete "RRC_CONNECTED:" and insert -- RRC_CONNECTED; --, therefor.

In Column 31, Line 5, delete "resumed:" and insert -- resumed; --, therefor.

In Column 31, Line 6, delete "procedure:" and insert -- procedure; --, therefor.

In Column 31, Line 14, delete "follows;" and insert -- follows: --, therefor.

In Column 31, Line 15, delete "PDV," and insert -- PDU, --, therefor.

In Column 31, Line 21, delete "S1B1;" and insert -- SIB1; --, therefor.

In Column 31, Lines 22-23, delete "reportUplinkTxDirectCurrent;" and insert -- reportUplinkTxDirectCurrent: --, therefor.

In Column 31, Line 31, delete "RRCReconfiguration;" and insert -- RRCReconfiguration: --, therefor.

In Column 31, Line 32, delete "fullConfig;" and insert -- fullConfig: --, therefor.

In Column 31, Line 34, delete "5.3.5.11:" and insert -- 5.3.5.11; --, therefor.

In Column 31, Lines 39-40, delete "masterKeyUpdate;" and insert -- masterKeyUpdate: --, therefor.

In Column 31, Line 46, delete "5.3.5.5:" and insert -- 5.3.5.5; --, therefor.

In Column 31, Line 48, delete "radioBearerConfig;" and insert -- radioBearerConfig: --, therefor.

In Column 31, Line 52, delete "measConfig;" and insert -- measConfig: --, therefor.

In Column 31, Lines 55-56, delete "dedicatedSIB1-Delivery;" and insert -- dedicatedSIB1-Delivery: --, therefor.

In Column 31, Lines 59-60, delete "dedicatedSystemInformationDelivery;" and insert -- dedicatedSystemInformationDelivery: --, therefor.

In Column 32, Lines 2-3, delete "reportUplinkTxDirectCurrent;" and insert -- reportUplinkTxDirectCurrent: --, therefor.

In Column 32, Line 12, delete "[10]:" and insert -- [10]; --, therefor.

In Column 32, Line 38, delete "MA C" and insert -- MAC --, therefor.

In Column 32, Line 46, delete "SEN" and insert -- SFN --, therefor.

In Column 32, Line 52, delete "SEN" and insert -- SFN --, therefor.

In Column 32, Line 55, delete "MCG;" and insert -- MCG: --, therefor.

In Column 33, Lines 11-12, delete "reconfiguration WithSyncfor" and insert -- reconfigurationWithSync for --, therefor.

In Column 33, Line 17, delete "connection" and insert -- connection. --, therefor.

In Column 34, Line 1, delete "in" and insert -- In --, therefor.

In Column 34, Lines 14-15, delete "configurations)" and insert -- configuration(s) --, therefor.

CERTIFICATE OF CORRECTION (continued)
U.S. Pat. No. 11,895,545 B2

In Column 35, Line 22, delete "(GSM)." and insert -- (GSM), --, therefor.

In Column 35, Line 24, delete "standards," and insert -- standards; --, therefor.

In Column 35, Line 26, delete "standards," and insert -- standards; --, therefor.

In Column 35, Line 55, delete "network" and insert -- network. --, therefor.

In Column 35, Line 58, delete "stations." and insert -- stations, --, therefor.

In Column 38, Line 33, delete "aid" and insert -- end --, therefor.

In Column 39, Line 1, delete "node" and insert -- node. --, therefor.

In Column 39, Lines 39-40, delete "w ireless devices" and insert -- wireless devices. --, therefor.

In Column 40, Line 8, delete "standard" and insert -- standard. --, therefor.

In Column 40, Line 13, delete "etc.)" and insert -- etc.). --, therefor.

In Column 40, Line 53, delete "612," and insert -- 612; --, therefor.

In Column 40, Line 57, delete "apart" and insert -- a part --, therefor.

In Column 41, Line 6, delete "gale" and insert -- gate --, therefor.

In Column 42, Line 9, delete "example." and insert -- example, --, therefor.

In Column 42, Line 33, delete "circuits" and insert -- circuits. --, therefor.

In Column 42, Line 59, delete "ty pes" and insert -- types --, therefor.

In Column 43, Line 55, delete "RRC_IDLE" and insert -- RRC_IDLE. --, therefor.

In Column 44, Line 27, delete "RRC_IDLE" and insert -- RRC_IDLE. --, therefor.

In Column 44, Line 29, delete "informing at least one target node candidate" and insert the same on Line 30, before "regarding the suspension" as a new sub-point.

In Column 44, Line 65, delete "embodiments," and insert -- embodiments; --, therefor.

In Column 45, Line 26, delete "station s" and insert -- station's --, therefor.

In Column 47, Line 4, delete "transmitted, and" and insert -- transmitted; and --, therefor.

In Column 47, Line 46, delete "44" and insert -- 44. --, therefor.

In the Claims

In Column 48, Line 50, in Claim 6, delete "received at" and insert -- at --, therefor.